US012772288B2

(12) United States Patent
Kusashima

(10) Patent No.: US 12,772,288 B2
(45) Date of Patent: Oct. 20, 2026

(54) TERMINAL DEVICE, BASE STATION DEVICE, AND COMMUNICATION METHOD

(71) Applicant: Sony Group Corporation, Tokyo (JP)

(72) Inventor: Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 361 days.

(21) Appl. No.: 18/547,334

(22) PCT Filed: Feb. 9, 2022

(86) PCT No.: PCT/JP2022/005110

§ 371 (c)(1),
(2) Date: Aug. 22, 2023

(87) PCT Pub. No.: WO2022/185869

PCT Pub. Date: Sep. 9, 2022

(65) Prior Publication Data

US 2024/0324009 A1 Sep. 26, 2024

(30) Foreign Application Priority Data

Mar. 3, 2021 (JP) ................................ 2021-033441

(51) Int. Cl.
*H04W 74/0816* (2024.01)
*H04W 72/21* (2023.01)
*H04W 72/231* (2023.01)
*H04W 74/08* (2024.01)

(52) U.S. Cl.
CPC ....... *H04W 74/0816* (2013.01); *H04W 72/21* (2023.01); *H04W 72/231* (2023.01); *H04W 74/0891* (2013.01)

(58) Field of Classification Search
CPC ............. H04W 74/0816; H04W 72/21; H04W 72/231; H04W 74/0891; H04W 74/0808;
(Continued)

(56) References Cited

U.S. PATENT DOCUMENTS

2020/0059963 A1* 2/2020 Damnjanovic ... H04W 74/0816
2020/0314899 A1* 10/2020 Sun ....................... H04L 5/0053
(Continued)

OTHER PUBLICATIONS

3GPP TS 37.213 V16.4.0, 3rd Generation Partnership Project; Technical Specification Group Radio Access Network; Physical layer procedures for shared spectrum channel access (Release 16), Dec. 2020 (Year: 2020).*
(Continued)

*Primary Examiner* — Andrew W Chriss
(74) *Attorney, Agent, or Firm* — XSENSUS LLP

(57) ABSTRACT

A terminal device is time-synchronized with a communication device at a synchronization boundary. The terminal device includes a wireless communication transceiver and a control circuitry. The control circuitry is configured to transmit determination information for determining whether or not to extend a channel occupancy time (COT) via a wireless transceiver, receive information regarding the COT, and perform uplink transmission on the basis of the information regarding the COT that has been received. In a case where the information regarding the COT does not indicate extension of the COT, the COT ends at least by a first sync boundary. In a case where the information regarding the COT indicates extension of the COT, the COT ends after the first sync boundary and by the end of a second sync boundary that occurs following the first sync boundary.

11 Claims, 14 Drawing Sheets

(58) Field of Classification Search
CPC ............. H04W 74/006; H04W 74/004; H04W 74/0841; H04W 74/085; H04W 74/0858
See application file for complete search history.

(56) References Cited

U.S. PATENT DOCUMENTS

| | | | | |
|---|---|---|---|---|
| 2021/0014892 | A1 | 1/2021 | Xue et al. | |
| 2021/0352688 | A1* | 11/2021 | Luo | H04W 72/1268 |
| 2021/0378010 | A1* | 12/2021 | Luo | H04W 16/14 |
| 2022/0167286 | A1* | 5/2022 | Damnjanovic | H04W 72/0453 |
| 2022/0225386 | A1* | 7/2022 | Salah | H04W 72/23 |

OTHER PUBLICATIONS

De Figueiredo et al, “A Spectrum Sharing Framework for Intelligent Next Generation Wireless Networks”, IEEE (Year: 2018).*

Moderator (Lenovo), “Summary of email discussion [100b~e-NR-unlic-NRU-DL _ Signals_and_Channels-02] on available RB set indication and COT duration”, 3GPP TSG RAN WG1#100bis-e, R1-2002787, Apr. 20-30, 2020, 24 pages.

International Search Report and Written Opinion mailed on Apr. 26, 2022, received for PCT Application PCT/JP2022/005110, filed on Feb. 9, 2022, 8 pages including English Translation.

Qualcomm, “How does unlicensed spectrum with NR-U transform what 5G can do for you?”, Available Online at: https://www.qualcomm.com/media/documents/files/ presentation-how-nr-u-can-transform-what-5g-can-do-for-you.pdf, Jun. 2020, 37 pages.

Qualcomm Incorporated, “5G NR Unlicensed in the new 6 GHz unlicensed band”, Available Online at: https://ecfsapi.fcc.gov/file/1116181935656/11-13-2019%20Qualcomm%20Ex%20P%20re%20EHT%20and%205G%20NR%20U.pdf, Nov. 13, 2019, 34 pages.

* cited by examiner

TERMINAL DEVICE, BASE STATION DEVICE, AND COMMUNICATION METHOD

CROSS-REFERENCE TO RELATED APPLICATIONS

The present application is based on PCT filing PCT/JP2022/005110, filed Feb. 9, 2022, which claims priority from Japanese Patent Application No. 2021-033441, filed Mar. 3, 2021, the entire contents of each are incorporated herein by reference.

FIELD

The present disclosure relates to a terminal device, a base station device, and a communication method.

BACKGROUND

Radio access schemes and wireless networks for cellular mobile communication (hereinafter also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") are under examination in the 3rd Generation Partnership Project (3GPP). Note that, in the following description, LTE includes LTE-A, LTE-A Pro, and EUTRA, and NR includes NRAT and FEUTRA. In LTE, a base station device (base station) is also referred to as an evolved NodeB (eNodeB), whereas in NR, a base station device (base station) is also referred to as a gNodeB, and a terminal device (mobile station, mobile station device, or terminal) is also referred to as user equipment (UE) and in LTE and NR. LTE and NR are cellular communication systems in which a plurality of areas covered by base station devices is arranged in cell shapes. A single base station device may manage a plurality of cells.

NR is radio access technology (RAT) different from LTE as a next-generation radio access scheme after LTE. NR is access technology capable of supporting various use cases including enhanced mobile broadband (eMBB), massive machine type communications (mMTC), and ultra-reliable and low latency communications (URLLC). NR is studied aiming at a technical framework supporting use scenarios, requirements, arrangement scenarios, and the like in those use cases.

In an unlicensed band (band for which no license is required) and a license shared band, operation of a radio access scheme based on cellular communication is under study. Coexistence with other nodes or radio systems is considered important in such an unlicensed band, and functions such as listen before talk (LBT) and discontinuous transmission that perform channel sensing before transmission are required for radio access schemes such as LTE and NR. Details of a radio access scheme based on the NR in the unlicensed band are disclosed in Non-Patent Literature 1. Note that the unlicensed band is, for example, a 2.4 GHz band, a 5 GHz band, a 6 GHz band, or a 60 GHz band. The license shared band is, for example, a 3.5 GHz band or a 37 GHz band.

Introduction of synchronous access is under study in the unlicensed band of the 6 GHz band. Synchronous access is an access scheme that allows simultaneous transmission in multiple cells because LBT can be completed simultaneously although synchronization is required among devices. As a result, as compared with conventional asynchronous access (load based equipment: LBE), improvement in area throughput by spatial reuse or improvement in communication reliability by coordinated multiple transmission and reception point (CoMP) can be expected. The synchronous access is disclosed in, for example, Non-Patent Literature 1.

CITATION LIST

Non-Patent Literature

Non-Patent Literature 1: Qualcomm, 5G NR Unlicensed in the new 6 GHz unlicensed band [online], Date of Retrieval: 2, Feb. 2021], the Internet <https://ecfsapi.fcc.gov/file/1116181935656/11-13-2019%20Qualcomm%20Ex%20P%20re%20EHT%20and%205-G%20NR%20U.pdf>

SUMMARY

Technical Problem

In synchronous access as disclosed in Non-Patent Literature 1, terminal devices are time-synchronized on the basis of predetermined timing (sync boundary). Non-Patent Literature 1 also discloses extension of channel occupancy time (COT).

However, Non-Patent Literature 1 does not sufficiently disclose how to determine whether or not to extend the COT, and the methods of the related art cannot implement continuous communication across a sync boundary in the synchronous access.

Therefore, the present disclosure provides a mechanism capable of implementing extension of COT in synchronous access.

Note that the above disadvantage or object is merely one of a plurality of disadvantages or objects that can be solved or achieved by a plurality of embodiments disclosed herein.

Solution to Problem

According to the present disclosure, a terminal device is provided. The terminal device is time-synchronized with a communication device at a synchronization boundary. The terminal device includes a wireless communication unit and a control unit. The control unit is configured to transmit determination information for determining whether or not to extend a channel occupancy time (COT) via a wireless communication unit, receive information regarding the COT, and perform uplink transmission on the basis of the information regarding the COT that has been received. In a case where the information regarding the COT does not indicate extension of the COT, the COT ends at least by a first sync boundary. In a case where the information regarding the COT indicates extension of the COT, the COT ends after the first sync boundary and by the end of a second sync boundary that occurs following the first sync boundary.

DESCRIPTION OF EMBODIMENTS

Hereinafter, embodiments of the present disclosure will be described in detail by referring to the accompanying drawings. Note that, in the present specification and the drawings, components having substantially the same functional configuration are denoted by the same symbols, and redundant description is omitted.

Note that, in the present specification and the drawings, components having substantially the same functional configuration may be distinguished by attaching different alphabets after the same symbol. For example, a plurality of components having substantially the same functional configuration are distinguished as in base station devices 20A and 20B, as necessary. However, in a case where it is not particularly necessary to distinguish each of a plurality of components having substantially the same functional configuration, they are denoted only by the same symbol. For example, in a case where it is not necessary to particularly distinguish between the base station devices 20A and 20B, they are simply referred to as the base station devices 20.

One or a plurality of embodiments (including examples and modifications) described below can be each implemented independently. Meanwhile, at least a part of the plurality of embodiments described below may be combined with and implemented together with at least a part of another embodiment as desired. The plurality of embodiments may include novel features different from each other. Therefore, the plurality of embodiments can contribute to solving different objects or problems and achieve different effects.

INTRODUCTION

Related Art (Exemplary Frame Structure)

Figure 1:
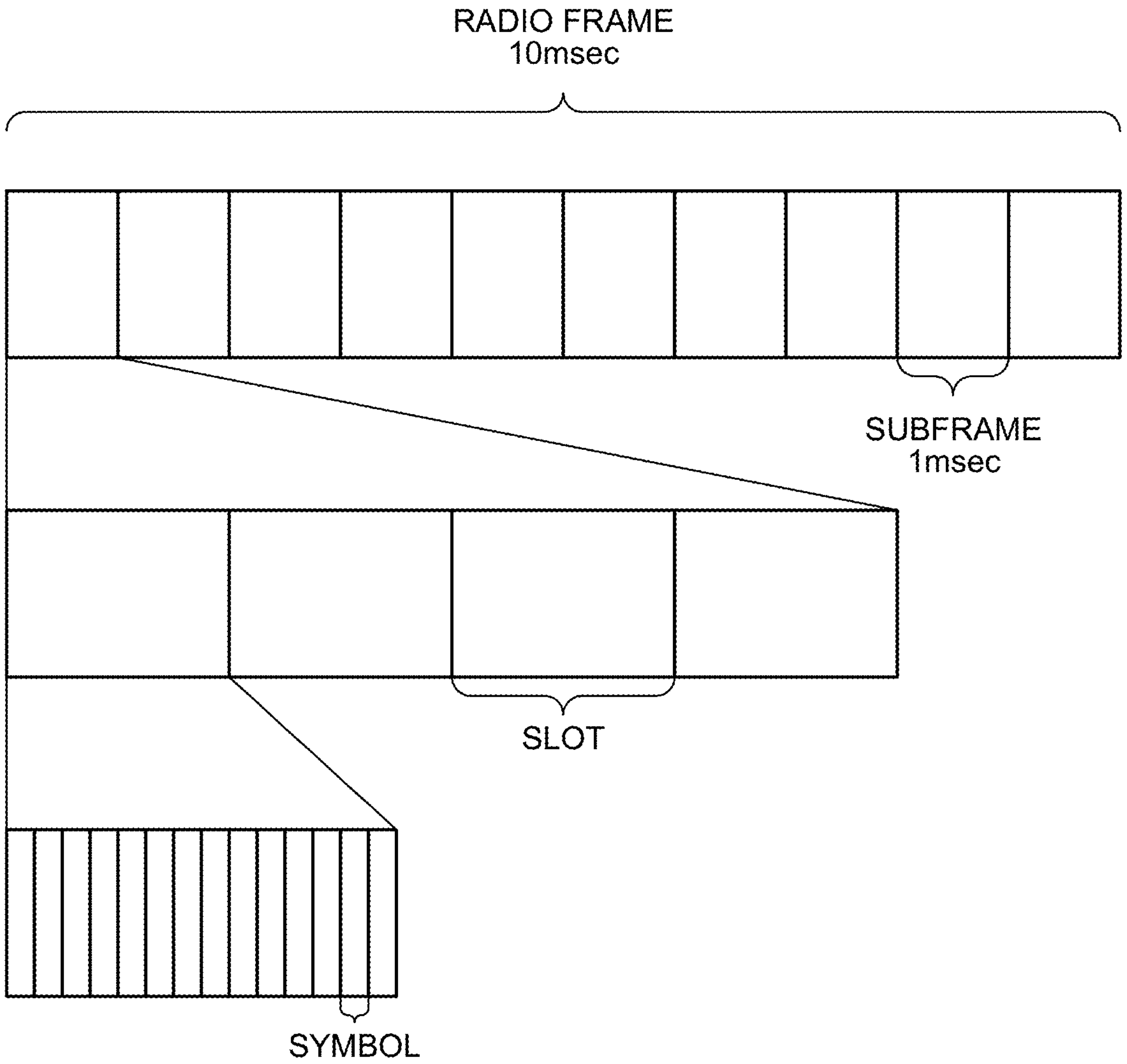
FIG. 1 is a diagram for explaining a radio frame.

FIG. 1 is a diagram for explaining a radio frame. As illustrated in FIG. 1, a radio frame consisting of 10 milliseconds (ms) is defined. Each radio frame consists of two half frames (not illustrated). The time interval of a half frame is 5 ms. Each half frame consists of five subframes. The time interval of a subframe is 1 ms. Moreover, one subframe includes one or more slots. The time interval of a slot depends on the numerology (OFDM numerology). The numerology is defined by a combination of subcarrier spacing (SCS) and cyclic prefix (CP). The subcarrier spacing supported in this embodiment is defined by a power of 2 based on 15 kilohertz (kHz). Table 1 shows an example of subcarrier spacing setting. Specifically, 15 kHz, 30 kHz, 60 kHz, 120 kHz, and 240 kHz are supported as the subcarrier spacing. The time interval of a slot is 1 ms for subcarrier spacing of 15 kHz, 0.5 ms for subcarrier spacing of 30 kHz, 0.25 ms for subcarrier spacing of 60 kHz, 0.125 ms for subcarrier spacing of 120 kHz, and 0.0625 ms for subcarrier spacing of 240 kHz. One slot includes fourteen symbols in a case of a normal CP and twelve symbols in a case of an extended CP.

TABLE 1

Exemplary subcarrier spacing setting

| Subcarrier spacing setting μ | Subcarrier spacing [KHz] | Cyclic prefix | Number of symbols per slot | Number of slots per radio frame | Number of slots per subframe |
|---|---|---|---|---|---|
| 0 | 15 | Normal CP | 14 | 10 | 1 |
| 1 | 30 | Normal CP | 14 | 20 | 2 |
| 2 | 60 | Normal CP | 14 | 40 | 4 |
| | | Extended CP | 12 | | |
| 3 | 120 | Normal CP | 14 | 80 | 8 |
| 4 | 240 | Normal CP | 14 | 160 | 16 |

(Resource Grid)

Figure 2:
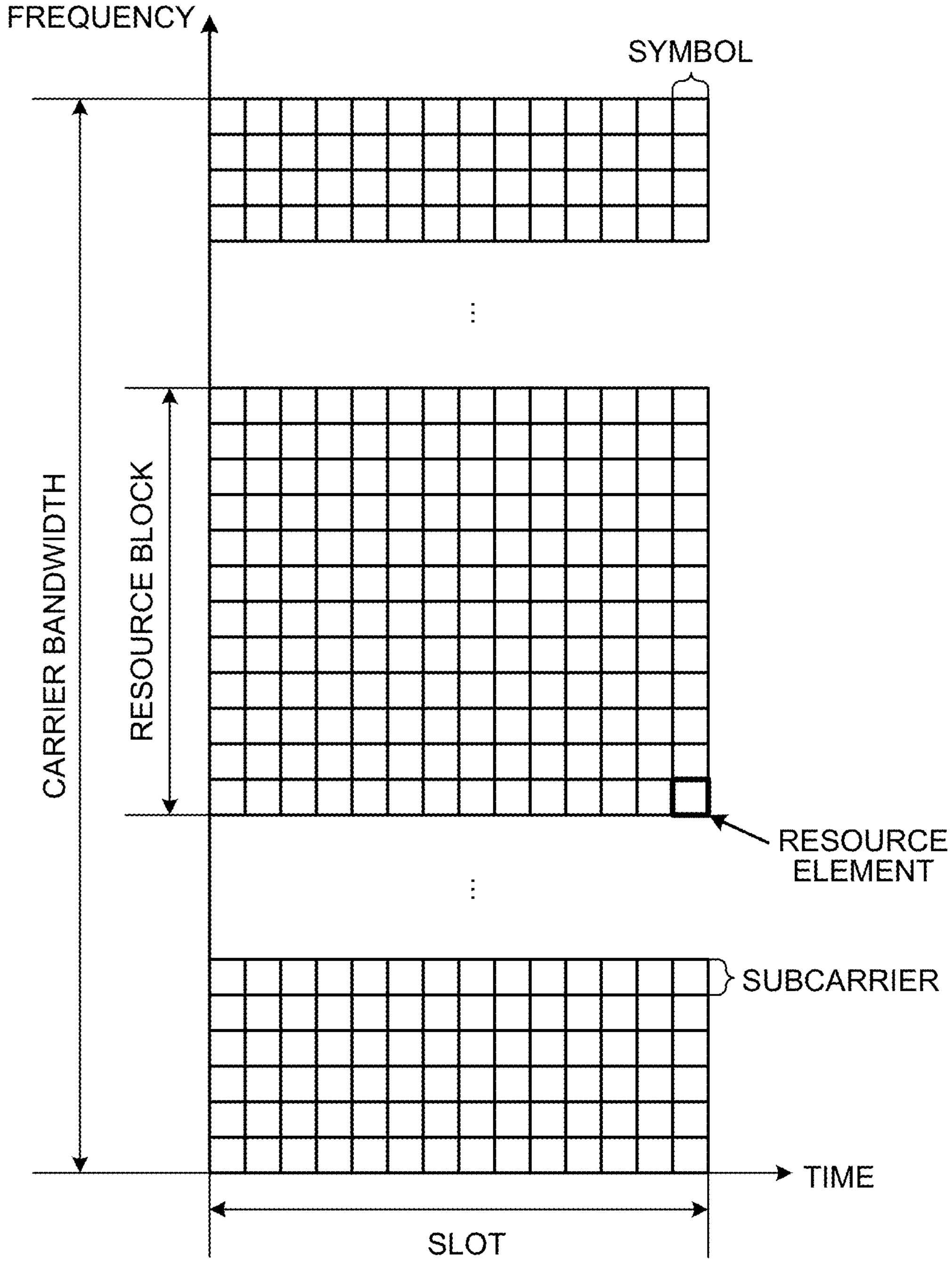
FIG. 2 is a diagram illustrating an example of a resource grid.
Figure 3:
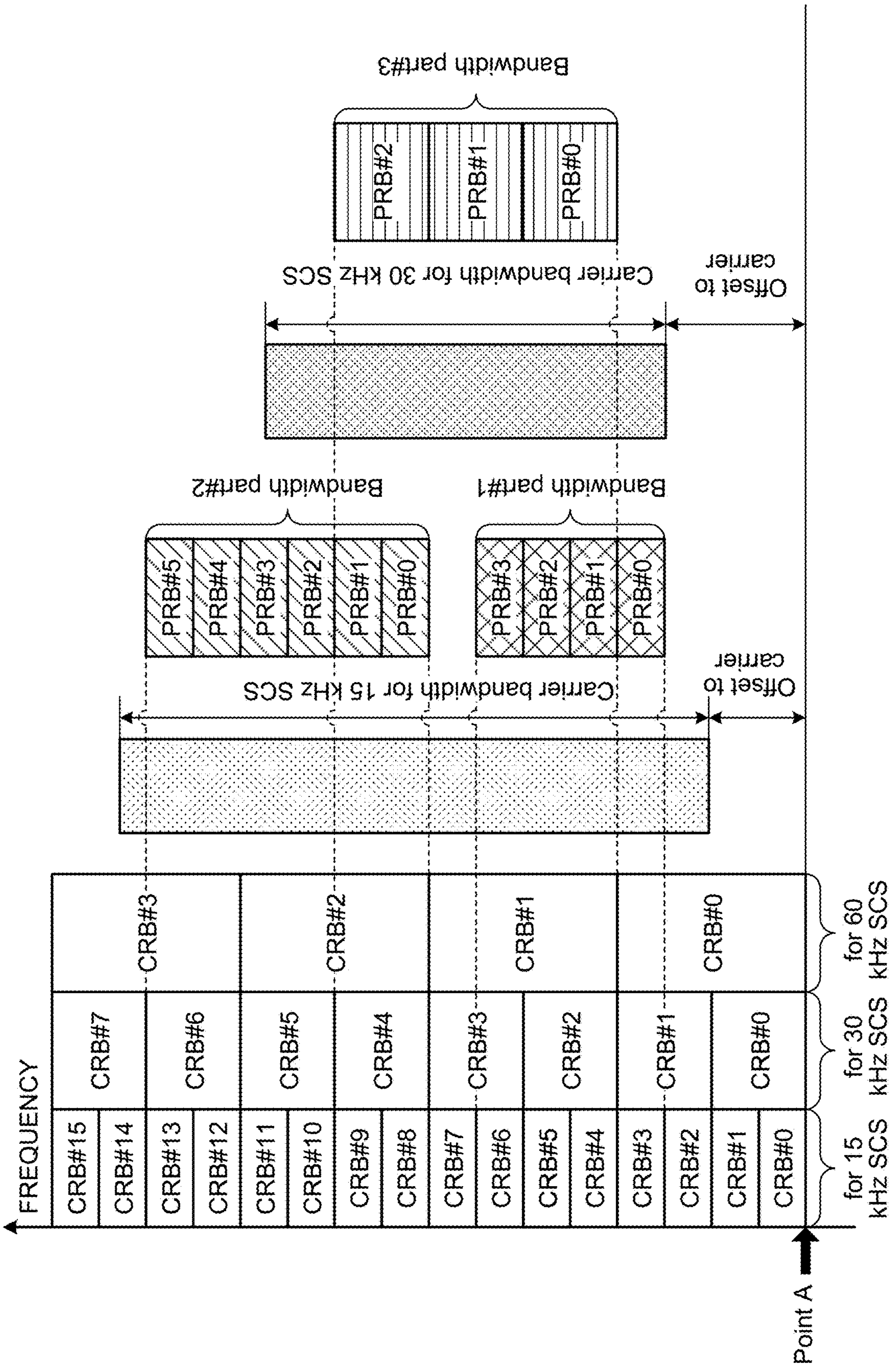
FIG. 3 is a diagram illustrating an example of bandwidth parts.

FIG. 2 is a diagram illustrating an example of a resource grid. Meanwhile, FIG. 3 is a diagram illustrating an example of bandwidth parts.

In this embodiment, in each numerology and carrier, a physical signal to be transmitted or the physical channel is represented, for example, by the resource grid illustrated in FIG. 2. The resource grid is defined by a plurality of resource elements. One resource element in a predetermined antenna port is represented by one subcarrier and one symbol. An index of a resource element at a predetermined antenna port may be represented by a combination of a subcarrier index and a symbol index.

In addition, in the present embodiment, a resource block that is a unit on the frequency axis is defined. One resource block (RB, physical resource block: PRB) includes twelve consecutive subcarriers on the frequency axis. The resource blocks are classified into common resource blocks (CRB), physical resource blocks (PRB), and virtual resource blocks (VRB). A common resource block is defined by a predetermined bandwidth and a predetermined numerology. In all numerologies, the common resource blocks start at Point A (see FIG. 3). The frequency specified at the point A is the center of subcarriers #0 of common resource blocks #0 in all numerologies. A physical resource block is defined in a predetermined bandwidth part, and a physical resource block index is numbered from 0 in the predetermined bandwidth part. A virtual resource block is a logical resource block and is used when a pre-coded signal of the PDSCH or PUSCH is mapped to a physical resource block.

In addition, in the embodiment, a subset of consecutive common resource blocks referred to as a bandwidth part (BWP) can be set. A bandwidth part using a predetermined numerology falls within a bandwidth of a carrier defined by that numerology. A maximum of four bandwidth parts are set for each terminal device. At given time, there is one active bandwidth part. It is not expected for a terminal device to receive the PDSCH, the PDCCH, or the CSI-RS outside the downlink active bandwidth part. The terminal device does not transmit the PUSCH or the PUCCH outside the uplink active bandwidth part. In a given active cell, the terminal device does not transmit an SRS outside the uplink active bandwidth part.

(Slot Format)

In a TDD cell (unpaired spectrum), each of fourteen symbols in a slot can be classified into a downlink (DL, D) state, an uplink (UL, U) state, or a flexible (F) state. A downlink symbol can be used for reception by the terminal device. An uplink symbol can be used for transmission by the terminal device. A flexible symbol can be used for transmission or reception by the terminal device. Alternatively, a flexible symbol may be utilized as a switching period or a guard period between downlink and uplink.

The states of these symbols are specified by TDD configuration information common to terminal devices (TDD-UL-DL-ConfigCommon), TDD configuration information dedicated to each terminal device (TDD-UL-DL-ConfigDedicaated) (both of which are transmitted by means of inclusion in an RRC message described above or below), and/or a slot format index carried by DCI.

The TDD configuration information common to the terminal devices includes information regarding the number of downlink slots and downlink symbols, the number of uplink slots and uplink symbols, and the period of uplink and downlink switching. The TDD configuration information common to the terminal devices includes information regarding all downlinks (all DL) and all uplinks (all UL) for each symbol, or the number of downlink symbols and the number of uplink symbols. A slot format index is an index of a slot format representing a combination of states of fourteen symbols and is specified from slot to slot. A format indicating a slot format is also referred to as a slot format indicator (SFI).

Figure 4:
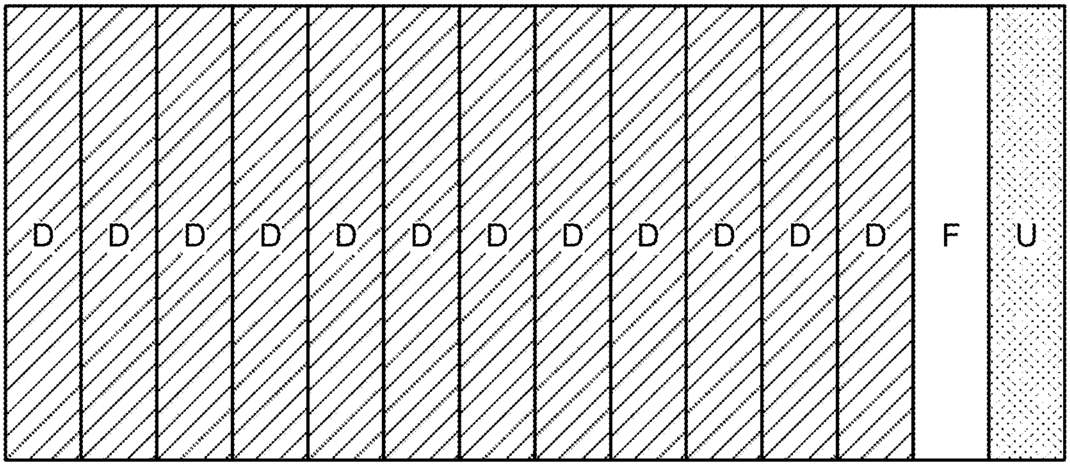
FIG. 4 is a diagram illustrating an example of a slot format.
Figure 5:
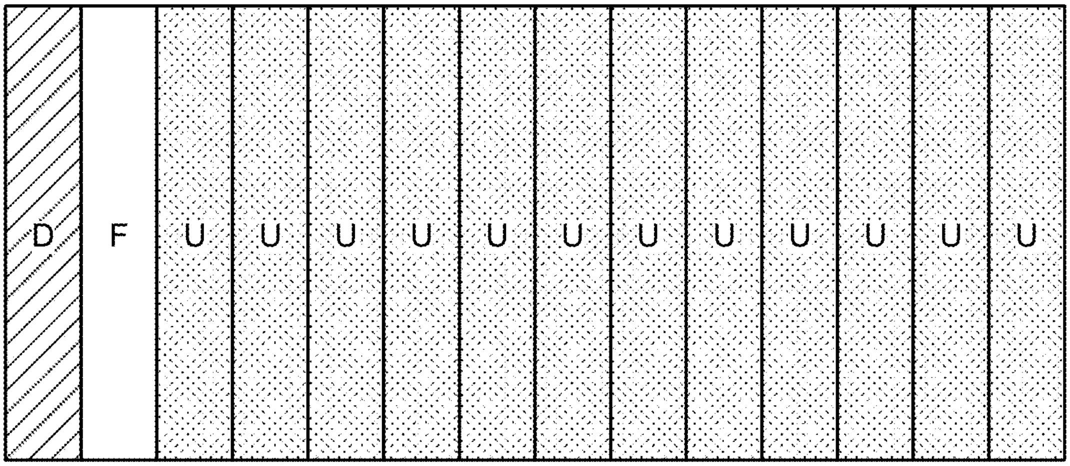
FIG. 5 is a diagram illustrating an example of a slot format.

The TDD configuration or the slot format described above makes it possible to flexibly switch between uplink and downlink from symbol to symbol. FIGS. 4 and 5 are diagrams illustrating examples of the slot format. In FIG. 4, first to twelfth symbols represent downlink symbols, a thirteenth symbol represents a flexible symbol, and a fourteenth symbol represents an uplink symbol. The SFI of this slot indicates "DDDDDDDDDDDDFU" in order from the head symbol of the slot. This enables transmission and reception of hybrid automatic repeat request (HARQ)-acknowledgement (ACK) corresponding to PDSCH in the same slot. In FIG. 5, a first symbol represents a downlink symbol, a second symbol represents a flexible symbol, and third to fourteenth symbols represent uplink symbols. The SFI of this slot indicates "DFUUUUUUUUUUUU" in order from the symbol of the slot. This enables transmission and reception of PUSCH corresponding to a UL grant in the same slot.

(Channel Access of Unlicensed Channel)

In a channel of an unlicensed band (hereinafter, also referred to as an unlicensed channel), a wireless communication device (base station device or terminal device) performs channel access (channel access, medium access, and listen before talk) before transmitting a signal. Note that the unlicensed channel is a unit of a frequency band in which the channel access is performed. The channel may also be expressed as a carrier, a frequency carrier, a component carrier, a cell, a frequency band, an LBT band, or the like.

In channel access, the wireless communication device performs a power measurement (also referred to as carrier sense, sensing, or channel clear assessment (CCA)) of the channel and compares the measured power value of the channel with an energy detection threshold. In case where the measured power value of the channel is lower than the energy detection threshold, the channel is determined as clear, and in a case where the measured power value of the channel is higher than the energy detection threshold, the channel is determined as busy. In a case where it is determined that the channel is clear in all the sensing slots, the wireless communication device can obtain a transmission right of the channel and transmit a signal.

Furthermore, the channel on which the wireless communication device has acquired the transmission right may be used for transmission by another wireless communication device. In this case, a grant is sent from the wireless communication device that has acquired the transmission right to the other wireless communication device.

A wireless communication device that acquires a transmission right of a channel is referred to as an initiating device. Another wireless communication device that uses the channel on which the wireless communication device has acquired the transmission right is referred to as a responding device.

Note that, in 3GPP, four types of LBT categories are defined as carrier sensing schemes. In the channel access, LBT corresponding to one of the following LBT categories is performed.

LBT category 1: No LBT

LBT category 2: LBT without random backoff

LBT category 3: LBT in which random backoff is performed with a contention window of a fixed size LBT category 4: LBT in which random backoff is performed with a contention window of a variable size Each of the LBT categories will be described with reference to FIGS. 6 to 8 below.

Figure 6:
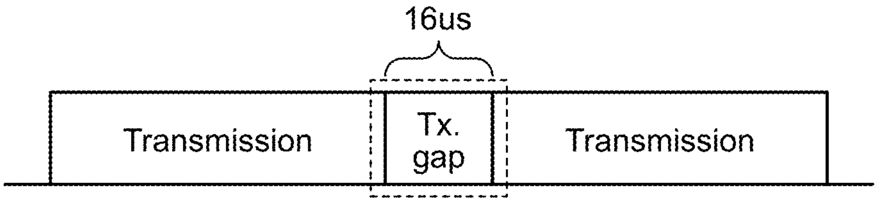
FIG. 6 is a diagram for explaining LBT category 1.

FIG. 6 is a diagram for explaining the LBT category 1. As illustrated in FIG. 6, in the LBT category 1, a wireless communication device performs communication without performing LBT. In the example of FIG. 6, the wireless communication device performs transmission at a transmission interval of 16 microseconds.

Figure 7:
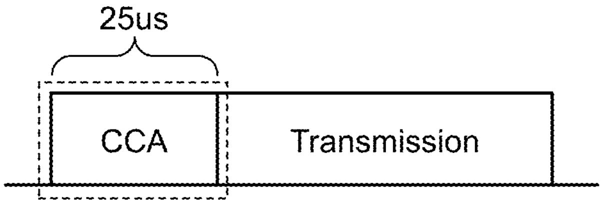
FIG. 7 is a diagram for explaining LBT category 2.

FIG. 7 is a diagram for explaining the LBT category 2. As illustrated in FIG. 7, in the LBT category 2, the wireless communication device performs LBT without random backoff to perform communication. In the example of FIG. 7, the wireless communication device performs sensing (for example, CCA) in one sensing slot and transmits a signal when it is determines that the channel is clear. In this example, the length of one sensing slot is 25 microseconds.

Figure 8:
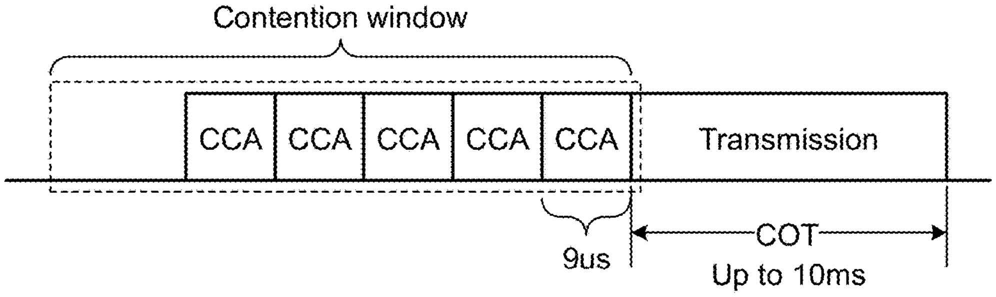
FIG. 8 is a diagram for explaining LBT categories 3 and 4.

FIG. 8 is a diagram for explaining the LBT categories 3 and 4. As illustrated in FIG. 8, in the LBT categories 3 and 4, the wireless communication device performs sensing (for example, CCA) a predetermined number of times in a contention window (CW) and transmits a signal in a case where it is determined that the channel is clear. That is, the wireless communication device performs sensing (for example, CCA) in sensing slots of the predetermined number of times and transmits the signal in a case where it is determined that the channel is clear in all the sensing slots. Illustrated in FIG. 8 is a case where the length of one sensing slot is 9 microseconds and the sensing (for example, CCA)

is performed five times. Note that the LBT category 3 and the LBT category 4 are different in whether the size of the contention window is fixed or variable. Alternatively, the LBT category 3 and the LBT category 4 are different in whether or not the contention window size is adjusted.

(Channel Access Procedure of Unlicensed Channel)

A channel access (channel access and listen before talk) procedure (channel access type) is performed to access an unlicensed channel on which transmission is performed at a base station device or a terminal device.

In a channel access procedure defined as a load-based equipment (LBE, dynamic channel access, channel access procedure in dynamic channel occupancy), sensing of a channel is performed once or a plurality of times. On the basis of the sensing result, it is determined whether the channel is idle (idle, unoccupied, available, or enable) or busy (busy, occupied, unavailable, or disable) (vacancy determination). In channel sensing, the power of a channel in a predetermined waiting time is sensed.

Examples of the waiting time of the channel access procedure include a first waiting time (slot), a second waiting time, a third waiting time (defer period), and a fourth waiting time.

A slot is a unit of waiting time of a base station device and a terminal device in a channel access procedure. A slot is defined as nine microseconds, for example.

In the second waiting time, one slot is inserted at the head. The second waiting time is defined as, for example, 16 microseconds.

The defer period includes the second waiting time and a plurality of consecutive slots following the second waiting time. The number of consecutive slots following the second waiting time is determined on the basis of the priority class (priority class or channel access priority class) used to satisfy the QoS.

The fourth waiting time includes the second waiting time followed by one slot. The fourth waiting time is defined, for example, as 25 microseconds.

The base station device or the terminal device senses a predetermined channel during a period of a predetermined slot. In a case where the power detected by the base station device or the terminal device for at least four microseconds within the predetermined slot period is smaller than a predetermined energy detection threshold, the predetermined slot is regarded as being idle. On the other hand, in a case where the power is larger than the predetermined energy detection threshold, the predetermined slot is regarded as being busy.

The channel access procedure includes a first channel access procedure, a second channel access procedure, and a third channel access procedure. The first channel access procedure is performed using a plurality of slots and a defer period. The second channel access procedure is performed by using one second waiting time or the fourth waiting time. The third channel access procedure is performed by using the second waiting time.

A parameter related to the channel access is determined on the basis of the priority class. Examples of parameters related to the channel access include a minimum contention window, a maximum contention window, a maximum channel occupancy time, and a possible value for the contention window. The priority class is determined by a value of a quality of service (QOS) class identifier (QCI) or a 5G QOS identifier (5QI) that processes the QoS. Table 2 is a correspondence table between the priority class and parameters related to channel access, and Table 3 shows an example of mapping between the priority class and the QCI. An example of mapping between the priority class and the 5QI is shown in Table 4.

TABLE 2

Exemplary correspondence table of priority class and parameters related to channel access

| Channel access priority class (p) | $m_p$ | Minimum contention window $CW_{min,p}$ | Maximum contention window $CW_{max,p}$ | Maximum channel occupancy time $T_{mcot,p}$ | Possible value of contention window $CW_p$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 3

Exemplary mapping between priority class and QCI

| Channel access priority class (p) | QCI |
|---|---|
| 1 | 1, 3, 5, 65, 66, 69, 70 |
| 2 | 2, 7 |
| 3 | 4, 6, 8, 9 |
| 4 | Other than the above |

TABLE 4

Exemplary mapping between priority class and 5QI

| Channel access priority class (p) | 5QI |
|---|---|
| 1 | 1, 3, 5, 65, 66, 67, 69, 70, 79, 80, 82, 83, 84 |
| 2 | 2, 7, 71 |
| 3 | 4, 6, 8, 9, 72, 73, 74, 76 |
| 4 | — |

(Details of First Channel Access Procedure)

The first channel access procedure (type 1 channel access procedure) is classified into the LBT category 3 or the LBT category 4.

In the first channel access procedure, the following procedure is performed.

(0) Perform channel sensing during the defer period. If the channel is idle in a slot within the defer period, go to step (1); otherwise, go to step (6).

(1) Acquire an initial value of a counter. A possible value of the initial value of the counter is an integer between 0 and a contention window CW. The initial value of the counter is randomly determined in accordance with a uniform distribution. The initial value of the counter is set to a counter N, and go to step (2).

(2) If the counter N is larger than 0 and it is selected to subtract from the counter N, 1 is subtracted from the counter N. Then, go to step (3).

(3) Add a slot period and wait. Moreover, the channel is sensed in the additional slot. If the additional slot is idle, go to step (4), otherwise go to step (5).

(4) If the counter N is 0, stop this procedure. Otherwise, go to step (2).

(5) Add a defer period and wait. Furthermore, the channel is sensed until it is detected to be busy in any one of slots included in the additional defer period or until all the slots included in the additional defer period can be detected to be idle. Then, go to step (6).

(6) If the channel is sensed to be idle in all of the slots included in the additional defer period, go to step (4), otherwise go to step (5).

After step (4) in the above procedure is stopped, transmission including data such as the PDSCH or the PUSCH is performed in the channel.

Note that after step (4) in the above procedure is stopped, transmission may not be performed in the channel. In this case, thereafter, in a case where the channel is idle in all of the slots and the defer period immediately before transmission, the transmission may be performed without performing the above procedure. On the other hand, in a case where the channel is not idle in either the slots or the defer period, after it is sensed that the channel is idle in all the slots within the additional defer period, go to step (1).

(Details of Second Channel Access Procedure)

The second channel access procedure (type 2 channel access procedure) is classified into the LBT category 2. In the second channel access procedure, transmission may be performed immediately after the channel is regarded as being idle as a result of sensing at least in the second waiting time or the fourth waiting time. On the other hand, in a case where it is determined that the channel is not idle as a result of sensing at least in the second waiting time or the fourth waiting time, no transmission is performed. The second channel access procedure is applied in a case where the transmission interval is 16 microseconds or 25 microseconds.

The second channel access procedure using the fourth waiting time is referred to as a type 2A channel access procedure, and the second channel access procedure using the second waiting time is referred to as a type 2B channel access procedure.

(Details of Third Channel Access Procedure)

The third channel access procedure (type 2C channel access procedure) is classified into the LBT category 1. In the third channel access procedure, the channel is not sensed before transmission. The third channel access procedure is applied in a case where the transmission interval is within 16 microseconds.

(Indication of Channel Access Type)

In the terminal device, the channel access procedure (channel access type) may be indicated by DCI. A field ChannelAccess-CPext or ChannelAccess-CPext-CAPC included in the DCI specifies a channel access type to be applied immediately before transmission of the PUSCH or the PUCCH. The field ChannelAccess-CPext is included in fallback DCI (DCI format 0_0 and DCI format 1_0), and the field ChannelAccess-CPext-CAPC field is included in non-fallback DCI (DCI format 0_1, DCI format 1_1, and others). Downlink grant DCI (DCI format 1_x) indicates the channel access type of the PUCCH, and uplink grant DCI (DCI format 0_x) indicates the channel access type of scheduled PUSCH. Note that terminal group-common DCI (DCI format 2_x) may indicate the channel access type of configured grant PUSCH.

(Contention Window Adaptation Procedure)

In the LBT category 4, a contention window adaptation procedure is performed.

The contention window CW used in the first channel access procedure is determined on the basis of the contention window adaptation procedure.

The value of the contention window CW is held for each priority class. Incidentally, the value of the contention window CW is between the value of the minimum contention window and the value of the maximum contention window. The minimum contention window and the maximum contention window are determined on the basis of the priority class.

Adjustment of the value of the contention window CW is performed before step (1) of the first channel access procedure. In a case where a proportion of negative acknowledgements (NACKs) in HARQ responses corresponding to a common channel in a reference HARQ process in at least a reference subframe (reference slot or reference period) in the contention window adaptation procedure is higher than a threshold, the value of the contention window CW is raised; otherwise, set the value of the contention window CW to that of the minimum contention window.

The value of the contention window CW is raised, for example, on the basis of an equation of $CW=2\cdot(CW+1)-1$.

The reference period is defined as a period from the head of the occupied channel to the end of a first slot containing the at least one unicast PDSCH or to the end of first transmission burst containing the at least one unicast PDSCH. For example, 90% is set as the threshold.

(Details of Channel Access Procedure in Downlink)

In a case where downlink transmission including the PDSCH, the PDCCH, and/or the EPDCCH is performed in an unlicensed channel, the base station device accesses the channel on the basis of the first channel access procedure and performs the downlink transmission.

Meanwhile, in a case where downlink transmission including a DRS but not including the PDSCH is performed in an unlicensed channel, the base station device accesses the channel on the basis of the second channel access procedure and performs the downlink transmission. Note that the period of the downlink transmission is preferably shorter than 1 millisecond.

(Details of Channel Access Procedure in Uplink)

In a case where it is indicated to perform the first channel access procedure by an uplink grant for scheduling the PUSCH in an unlicensed channel, the terminal device performs the first channel access procedure before the uplink transmission including the PUSCH.

Alternatively, in a case where it is indicated to perform the second channel access procedure by an uplink grant for scheduling the PUSCH, the terminal device performs the second channel access procedure before the uplink transmission including the PUSCH.

In addition, for uplink transmission not including the PUSCH but including an SRS, the terminal device performs the second channel access procedure before the uplink transmission.

In addition, in a case where the end of the uplink transmission indicated by the uplink grant is within an uplink duration (UL duration), regardless of the procedure type indicated by the uplink grant, the terminal device performs the second channel access procedure before the uplink transmission.

In addition, in a case where the uplink transmission continues over the fourth waiting time after the end of downlink transmission from the base station device, the terminal device performs the second channel access procedure before the uplink transmission.

NR Channel Access Procedure in Present Embodiment

In the channel access procedure in the unlicensed channel using NR, non-beamformed channel sensing and beamformed channel sensing can be performed.

The non-beamformed channel sensing is channel sensing by reception whose directivity is not controlled or channel sensing having no direction information. The channel sensing having no direction information is, for example, channel sensing in which measurement results in all directions are averaged. A transmitting station (terminal device) may not recognize the directivity (angle or direction) used in the channel sensing.

The beamformed channel sensing is channel sensing by directivity-controlled reception or channel sensing having direction information. That is, it is channel sensing in which a reception beam is directed in a predetermined direction. A transmitting station (terminal device) having a function of performing beamformed channel sensing can perform channel sensing one or more times using different directivities.

By performing beam-formed channel sensing, an area detected by sensing is narrowed. As a result, the transmitting station (terminal device) can reduce the frequency of detection of a communication link that does not interfere and reduce the exposed terminal problem.

(Channel Access of Frame Based Equipment (FBE))

Figure 9:
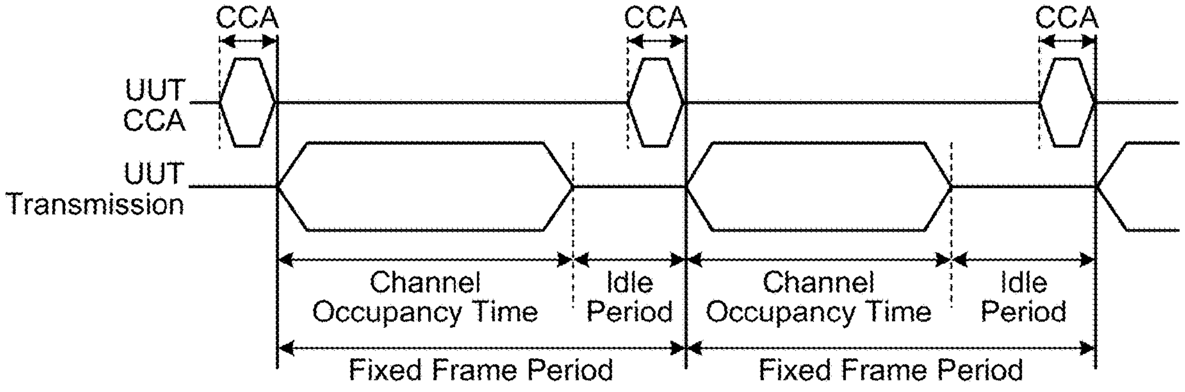
FIG. 9 is a diagram for describing an overview of frame based equipment (FBE).

FIG. 9 is a diagram for describing an overview of frame based equipment (FBE). An upper part of FIG. 9 illustrates the timing of channel clear assessment (CCA) with the horizontal axis as the time axis. A lower part of FIG. 9 illustrates the transmission timing with the horizontal axis as the time axis.

As illustrated in FIG. 9, in a channel access (Channel access, Listen before Talk) procedure defined as the frame based equipment (FBE, semi-static channel access, channel access procedure in semi-static channel occupancy), sensing of the channel is performed once before transmission. On the basis of the sensing result, it is determined whether the channel is idle (idle, unoccupied, available, or enable) or busy (busy, occupied, unavailable, or disable) (vacancy determination). In channel sensing, the power of a channel in a predetermined waiting time is sensed.

The transmission and/or reception configuration used in the frame based equipment has periodic timing referred to as a fixed frame period.

A fixed frame period is set in the channel access of the frame based equipment. The fixed frame period is set between 1 millisecond and 10 milliseconds. The fixed frame period cannot be changed more than once in 200 milliseconds.

In the channel access of the frame based equipment, the equipment performs channel sensing immediately before initiation of transmission from the head of the fixed frame period. The device performs sensing once using one slot shorter than or equal to nine microseconds. As a result of sensing the channel, in a case where the power value is greater than the predetermined energy detection threshold, the channel is considered busy. On the other hand, in a case where the power value is less than the predetermined energy detection threshold, the channel is clear, and the equipment can transmit. The equipment can transmit during a channel occupancy time. If it is within a channel occupancy time and a gap between a plurality of transmissions is less than or equal to 16 microseconds, the equipment can perform a plurality of transmissions without performing sensing. On the other hand, in a case where the gap between the plurality of transmissions exceeds 16 microseconds, the equipment needs to perform additional channel sensing. In the additional channel sensing, similarly, sensing is performed once using one slot.

The channel occupancy time in the channel access of the frame based equipment does not exceed 95% of the fixed frame period. An idle period in the channel access of the frame based equipment is greater than or equal to 5% of a fixed frame period. Note that the idle period is greater than or equal to 100 microseconds.

Transmission of a response (ACK/NACK or HARQ-ACK) to the transmission from the equipment may be performed within the channel occupancy time.

The fixed frame period is announced to the terminal device by a system information block (SIB). Note that the idle period and/or the maximum channel occupancy time may be announced together with the fixed frame period.

The fixed frame period, the idle period, and/or the maximum channel occupancy time may be different for from equipment to equipment. Specifically, the fixed frame period of the base station device and the fixed frame period of the terminal device may be different. The terminal device receives and sets configuration information (configuration information regarding a channel occupancy time (COT) started by the base station device) related to the fixed frame period of the base station device and configuration information (configuration information regarding a COT started by the terminal device) related to the fixed frame period of the terminal device as separate pieces of information.

Furthermore, the start position of the fixed frame period of the base station device and the start position of the fixed frame period of the terminal device may be different.

(Details of Synchronous Access)

Figure 10:
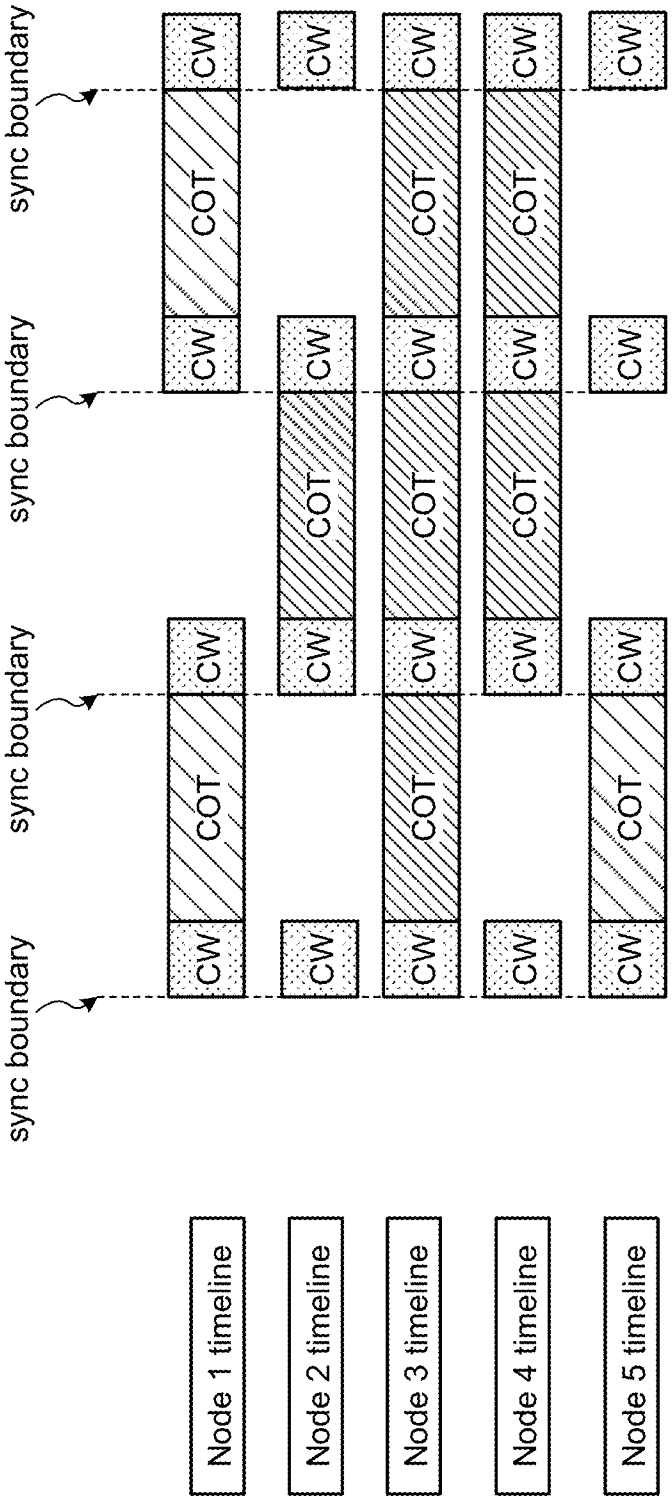
FIG. 10 is a diagram for explaining an example of synchronous access.

FIG. 10 is a diagram for explaining an example of synchronous access. In the synchronous access, wireless communication devices (nodes, devices, base station devices, and terminal devices) are time-synchronized, and transmission by wireless communication devices (nodes 1 to 5 in FIG. 10) ends at predetermined timing (for example, a sync boundary). Then, the wireless communication devices (the node 1 to the node 5 in FIG. 10) starts LBT (type 1 channel access procedure) from the sync boundary and ends the LBT (type 1 channel access procedure) in a predetermined period (period denoted as CW in FIG. 10). Among the wireless communication devices that are synchronized with the LBT succeeding simultaneously, channel access rights (COT) are simultaneously acquired, which enables simultaneous transmission among a plurality of wireless communication devices.

Figure 11:
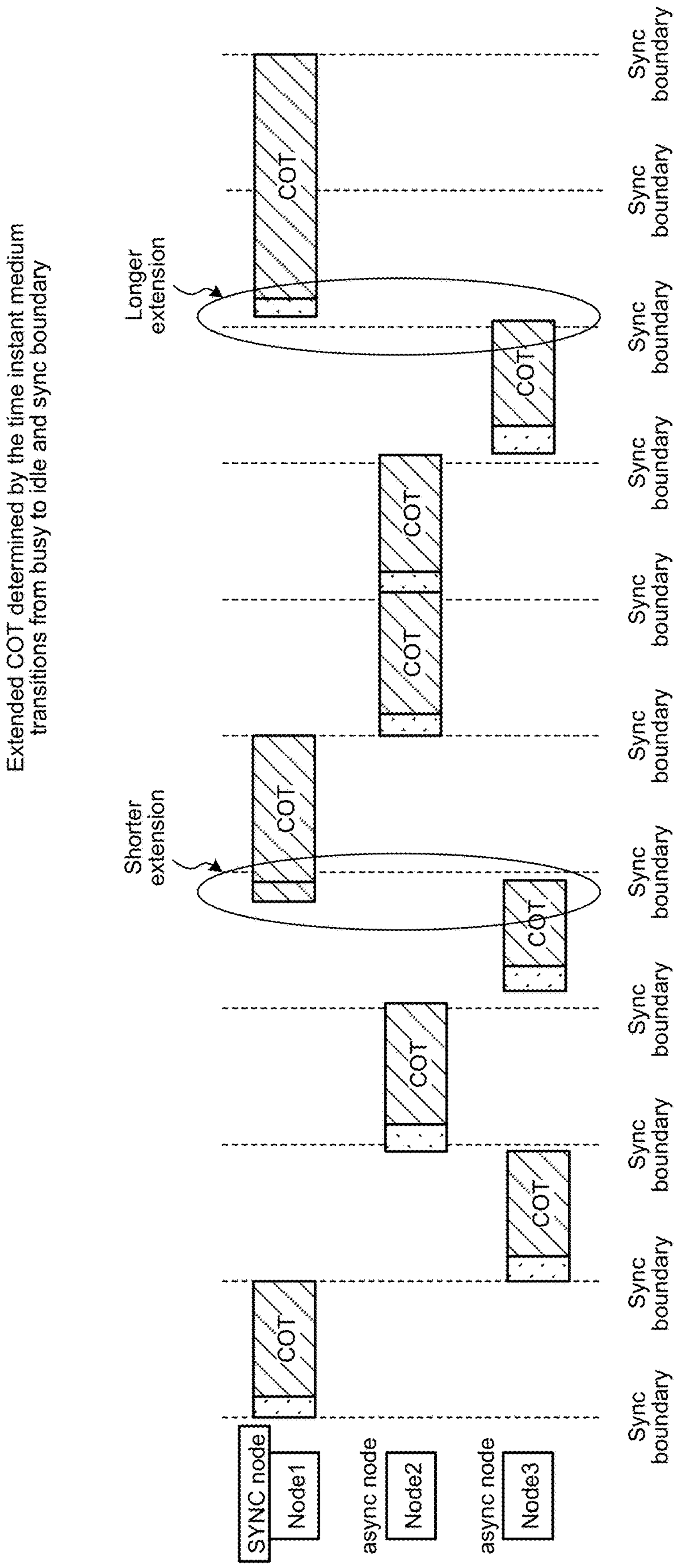
FIG. 11 is a diagram for explaining another example of synchronous access.

FIG. 11 is a diagram for explaining another example of synchronous access. In FIG. 11, the node 1 is a wireless communication device that performs synchronous access, and the nodes 2 and 3 are wireless communication devices that perform asynchronous access. As illustrated in FIG. 11, the node 1 ends transmission at predetermined timing (for example, a sync boundary). Meanwhile, the nodes 2 and 3 perform transmission regardless of the predetermined timing.

As illustrated in FIG. 11, in the synchronous access, a channel occupancy time can be extended. As an example in which a channel occupancy time can be extended, there is a case where the channel is occupied by another wireless communications device at a sync boundary. In this case, the wireless communication device of the synchronous access can perform channel acquisition at timing other than the sync boundary and occupy the channel up to two more sync boundaries. This enables fair channel occupancy with an asynchronous wireless communication device.

(Relationship between Channel Access Priority Class and Maximum COT)

In synchronous access, the correspondence between the priority class and parameters related to channel access is defined. An example of a correspondence table of priority classes in synchronous access and parameters related to channel access is shown in Table 5.

TABLE 5

Exemplary correspondence table of priority class and parameters related to channel access in synchronous access

| Channel access priority class (p) | $m_p$ | Minimum contention window $CW_{min,p}$ | Maximum contention window $CW_{max,p}$ | Maximum channel occupancy time $T_{mcot,p}$ |
|---|---|---|---|---|
| 1 | 1 | 3 | 7 | 2 ms |
| 2 | 1 | 7 | 15 | 3 ms |
| 3 | 3 | 15 | 63 | 6 or 12 ms |
| 4 | 7 | 15 | 1023 | 6 or 12 ms |

<History>

In NR-Unlicensed (NR-U), it is assumed to support various use cases such as, not only licensed assisted access (LAA) using a carrier aggregation mechanism, but also dual connectivity, a stand-alone operated only with an unlicensed band, or one of a DL carrier or a UL carrier being a licensed band and the other being an unlicensed band (for example, licensed DL+unlicensed UL).

In general, in an unlicensed band (unlicensed band, unlicensed spectrum, shared spectrum, or band on which CCA operation is required), a communication device performs channel sensing before transmitting the physical channel and/or a physical signal, and listen before talk (LBT) for determining whether the channel is clear or busy is used. In a case where the channel is clear (LBT successful), the communication device can transmit the physical channel and/or a physical signal. On the other hand, in a case where the channel is busy (LBT failed), the communication device cannot transmit the physical channel and/or the physical signal.

The NR-U supports the 6 GHz band. In order to release the 6 GHz band as a new unlicensed band in the United States and Europe, a legal framework is under development.

As channel access schemes of the related art, the above-described LBE and FBE are defined. The LBE is an asynchronous channel access scheme. The LBE is a channel access scheme capable of fairly giving access opportunities among wireless communication devices sharing a channel but is an inefficient scheme for implementing simultaneous transmission at a plurality of points. Meanwhile, the FBE is a synchronous channel access scheme. FBE is a channel access scheme that is compatible with simultaneous transmission at a plurality of multiple points but is difficult to coexist with the LBE.

In the 6 GHz band, study for introducing the above-described synchronous access has been started as a new channel access scheme different from the LBE and the FBE. Synchronous access is an access scheme that allows simultaneous transmission in multiple cells because the LBT can be completed simultaneously although synchronization is required among wireless communication devices. As a result, while co-existing with the asynchronous access (load based equipment (LBE)), improvement in area throughput by spatial reuse or improvement in communication reliability by coordinated multiple transmission and reception point (CoMP) can be expected.

In a wireless communication device specified as synchronous access, at least the following operation is performed.

In synchronous access, no transmission is performed beyond the next sync boundary or the sync boundary after the next sync boundary.

That is, in a case of a normal COT, the wireless communication device stops transmission at the next sync boundary. Meanwhile, in a case of COT extension, the wireless communication device stops transmission at the sync boundary after the next sync boundary.

On the other hand, in a case where the synchronous access is applied to the wireless communication device, it is necessary to recognize at least a sync boundary in the synchronous access. In a case where the sync boundary in the synchronous access is not recognized, it is difficult to satisfy the maximum COT requirement under the law.

Therefore, the present disclosing party has intensively studied a mechanism in which a wireless communication device recognizes a sync boundary in synchronous access. As a result, the present disclosing party has devised a mechanism in which a wireless communication device recognizes a sync boundary in synchronous access as described below.

In the technology of the present disclosure, a terminal device operating in synchronous access is notified of at least a sync boundary. COT release timing is determined on the basis of the sync boundary of which notification is made. The maximum COT is further determined on the basis of the sync boundary and COT acquisition timing.

For example, a terminal device according to the technology of the present disclosure performs time synchronization with another communication device at a sync boundary and includes a wireless transceiver and a processor. The processor transmits, via the wireless transceiver, information for determining whether or not to extend the channel occupancy time (COT). The processor receives information indicating the COT and performs uplink transmission on the basis of the information indicating the COT that has been received. In a case where the received information does not indicate an extended COT, the COT ends at least by a first sync boundary. On the other hand, in a case where the received information indicates an extended COT, the COT extends beyond the first sync boundary and by a second sync boundary that occurs following the first sync boundary.

Configuration Example

Configuration Example of Communication System

Figure 12:
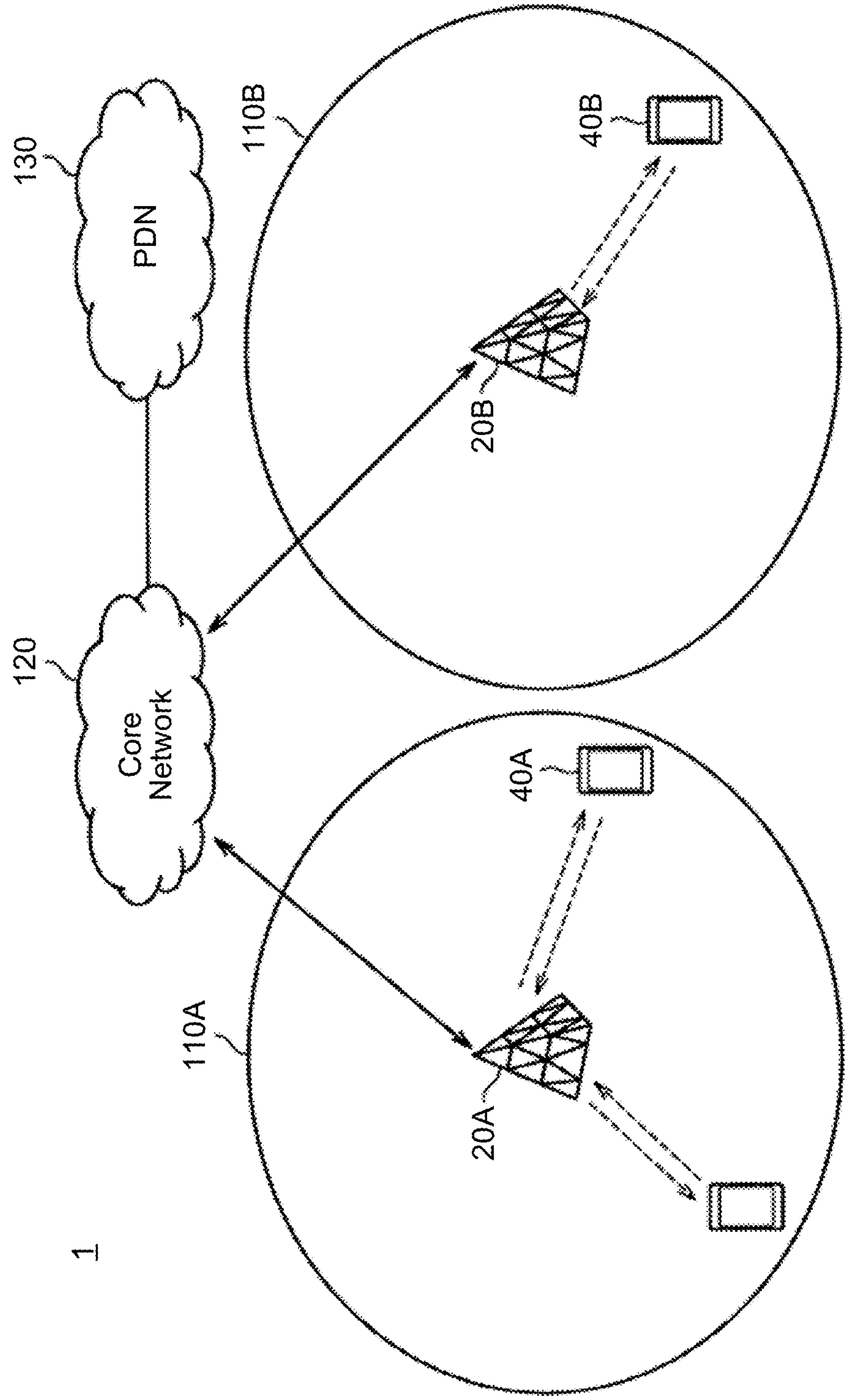
FIG. 12 is a diagram illustrating an example of the overall configuration of a communication system according to an embodiment of the present disclosure.

FIG. 12 is a diagram illustrating an example of the overall configuration of a communication system 1 according to an embodiment of the present disclosure. As illustrated in FIG. 12, the communication system 1 includes a plurality of base station devices 20 (20A and 20B), a plurality of terminal devices 40 (40A and 40B), a core network 120, and a packet data network (PDN) 130. Note that the number of devices of each type is not limited thereto, and for example, there may be one base station device 20 and one terminal device 40.

A base station device 20 is a communication device that operates a cell 110 and provides radio communication services to one or more terminal devices 40 located inside the coverage of the cell 110. The cell 110 is operated in accordance with any wireless communication scheme such as LTE or NR. The base station device 20 is connected to the core network 120. The core network 120 is connected to the packet data network (PDN) 130 via a gateway device (not illustrated). Note that the base station device 20 may include a set of a plurality of physical or logical devices. For example, in the embodiment of the disclosure, the base station device 20 may be distinguished into a plurality of devices of a baseband unit (BBU) and a radio unit (RU) and may be interpreted as aggregate of the plurality of devices. Furthermore or alternatively, in the embodiment of the disclosure, the base station device 20 may be either one or both of a BBU and an RU. The BBU and the RU may be connected by a predetermined interface (for example, eCPRI). Furthermore or alternatively, the RU may be referred to as a remote radio unit (RRU) or a Radio DoT (RD). Furthermore or alternatively, the RU may correspond to a gNB-DU described later. Furthermore or alternatively, the BBU may correspond to a gNB-CU described later. Furthermore or alternatively, the RU may be a device integrally formed with an antenna. An antenna (for example, an antenna integrally formed with an RU) included in the base station device 20 may adopt advanced antenna systems and support MIMO (for example, FD-MIMO) or beamforming. In the advanced antenna systems, an antenna (for example, an antenna integrally formed with the RU) included in the base station device 20 may include, for example, 64 transmission antenna ports and 64 reception antenna ports.

Furthermore, a plurality of base station devices 20 may be connected to each other. One or more base station devices 20 may be included in a radio access network (RAN). That is, the base station device 20 may be simply referred to as a RAN, a RAN node, an access network (AN), or an AN node. A RAN in LTE is referred to as an enhanced universal terrestrial RAN (EUTRAN). A RAN in NR is referred to as an NGRAN. A RAN in W-CDMA (registered trademark) (UMTS) is referred to as a UTRAN. The base station device 20 in LTE is referred to as an evolved node B (eNodeB) or an eNB. That is, the EUTRAN includes one or more eNodeBs (eNBs). Meanwhile, the base station device 20 of NR is referred to as a gNodeB or a gNB. That is, the NGRAN includes one or more gNBs. Furthermore, the EUTRAN may include a gNB (en-gNB) connected to a core network (EPC) in an LTE communication system (EPS). Similarly, the NGRAN may include an ng-eNB connected to a core network 5GC in a 5G communications system (5GS). Furthermore or alternatively, in a case where the base station device 20 is an eNB, a gNB, or the like, it may be referred to as 3GPP Access. Furthermore or alternatively, in a case where the base station device 20 is a wireless access point, it may be referred to as Non-3GPP access. Furthermore or alternatively, the base station device 20 may be an optical extension device called a remote radio head (RRH). Furthermore or alternatively, in a case where the base station device 20 is a gNB, the base station device 20 may be referred to as a combination of the above-described gNB central unit (CU) and gNB distributed unit (DU) or any one of them. The gNB central unit (CU) hosts a plurality of upper layers (for example, RRC, SDAP, or PDCP) in the access stratum for communication with UEs. Meanwhile, the gNB-DU hosts a plurality of lower layers (for example, RLC, MAC, PHY) in the access stratum. That is, among messages and information described later, RRC signalling (for example, various SIBs including MIB and SIB1, an RRCSetup message, and an RRCReconfiguration message) may be generated by the gNB CU, whereas DCI or various physical channels (for example, PDCCH or PBCH) described later may be generated by the gNB-DU. Alternatively, in the RRC signalling, for example, some configurations such as IE: cellGroupConfig may be generated by the gNB-DU, and the remaining configurations may be generated by the gNB-CU. These configurations may be transmitted and received by an F1 interface described later. The base station device 20 may be configured to be capable of communicating with another base station device 20. For example, in a case where the plurality of base station devices 20 is eNBs or a combination of eNBs and en-gNBs, the base station devices may be connected by an X2 interface. Furthermore or alternatively, in a case where the plurality of base station devices 20 is gNBs or a combination of gn-eNBs and gNBs, the devices may be connected by the Xn interface. Furthermore or alternatively, in a case where the plurality of base station devices 20 is a combination of gNB central units (CUs) and gNB distributed units (DUs), the devices may be connected by the above-described F1 interface. Message and information (information of RRC signalling or DCI, physical channel) described later may be communicated between the plurality of base station devices 20 (e.g. via X2, Xn, or F1 interface). That is, information regarding the COT described later or all or a part of the information (for example, configuration information for specifying timing of the synchronization boundary, downlink physical channel or occasion configuration information of downlink physical signals, configuration information of the idle period, physical channel/physical signal transmission stop timing, maximum COT end timing information, TDD-UL-DL configuration, RACH occasion configuration information, or information about whether or not COT extension is scheduled to be performed) may be included in at least one of RRC signalling, physical control information (for example, DCI), MAC CE, a message defined by an application protocol (for example, X2AP, XnAP, or F1AP) on the interface between base stations, or a message defined by an application protocol (for example, S1AP or NGAP) on the interface between a base station and a core network described above or later.

Furthermore, as described above, a base station device 20 may be configured to manage a plurality of cells. A cell provided by the base station device 20 is referred to as a serving cell. Serving cells include a primary cell (PCell) and a secondary cell (SCell). In a case where dual connectivity (for example, EUTRA-EUTRA dual connectivity, EUTRA-NR dual connectivity (ENDC), EUTRA-NR dual connectivity with 5GC, NR-EUTRA dual connectivity (NEDC), or NR-NR dual connectivity) is provided to UEs (for example, terminal devices 40), a PCell and zero or one or more SCell (s) provided by a master node (MN) are referred to as a master cell group. The serving cells may also include a PSCell (primary secondary cell or primary SCG cell). That is, in a case where dual connectivity is provided to UEs, a PSCell and zero or one or more SCell (s) provided by a secondary node (SN) are referred to as a secondary cell group (SCG). Unless specially configured (for example, PUCCH on SCell), the transmission in the physical uplink control channel (PUCCH) is performed in the PCell and the PSCell but not in the SCells. In addition, a radio link failure is detected in the PCell and the PSCell but not in the SCells (no need to be detected). As described above, since the PCell and the PSCell have a special role among the serving cell (s), they are also referred to as special cells (SpCells). One downlink component carrier and one uplink component carrier may be associated with one cell. In addition, a system bandwidth corresponding to one cell may be divided into a plurality of bandwidth parts. In this case, one or more bandwidth parts (BWPs) may be configured for a UE, and one bandwidth part may be used for the UE as an active BWP. Furthermore, radio resources (for example, a frequency band, numerology (subcarrier spacing), and a slot format (slot configuration)) that a terminal device 40 can use may be different from cell to cell, component carrier to component carrier, or BWP to BWP.

In a case where the core network 120 is an NR core network (5G Core (5GC)), the core network 120 may include an access and mobility management function (AMF), a session management function (SMF), a user plane function (UPF), a policy control function (PCF), and unified data management (UDM).

In a case where the core network 120 is an LTE core network (Evolved Packet Core (EPC)), the core network 120 may include a mobility management entity (MME), a serving gateway (S-GW), a PDN gateway (P-GW), a policy and charging rule function (PCRF), and a home subscriber server (HSS). The AMF and the MME are control nodes that handle control plane signals and manage mobility of a terminal device 40. The UPF and the S-GW/P-GW are nodes that handle user plane signals. The PCF/PCRF is a control node that performs control related to a policy such as quality of service (QoS) and charges for a PDU session or a bearer. The UDM/HSS is a control node that handles subscriber data and performs service control.

A terminal device 40 is a communication device that wirelessly communicates with a base station device 20 under control by the base station device 20. For example, the terminal device 40 measures a downlink signal from the base station device 20 and reports measurement information indicating a measurement result to the base station device 20. The base station device 20 controls radio communication with the terminal device 40 on the basis of the reported measurement information. Meanwhile, the terminal device 40 can transmit an uplink signal for measurement to the base station device 20. In this case, the base station device 20 measures the uplink signal from the terminal device 40 and controls radio communication with the terminal device 40 on the basis of the measurement information.

As described above, base station devices 20 can transmit and receive information to and from each other using an inter-base station interface. In a case where the core network is a 5GC, the inter-base station interface may be the Xn interface. In a case where the core network is the EPC, the inter-base station interface may be the X2 interface. For example, the base station device 20 transmits, to another adjacent base station device 20, measurement information (for example, a measurement result of a cell managed by a source base station device or a measurement result of a neighboring cell) related to a terminal device 40 which is estimated to perform handover. As a result, a stable handover is implemented, and the stability of the radio communication of the terminal devices 40 is secured.

Note that, although not illustrated in FIG. 12, there may be a communication device that provides radio communication services operated by other RAT such as Wi-Fi (registered trademark) or MulteFire (registered trademark) other than cellular communication around the communication system 1. Such a communication device is typically connected to the PDN 130.

Configuration Example of Base Station Device

Figure 13:
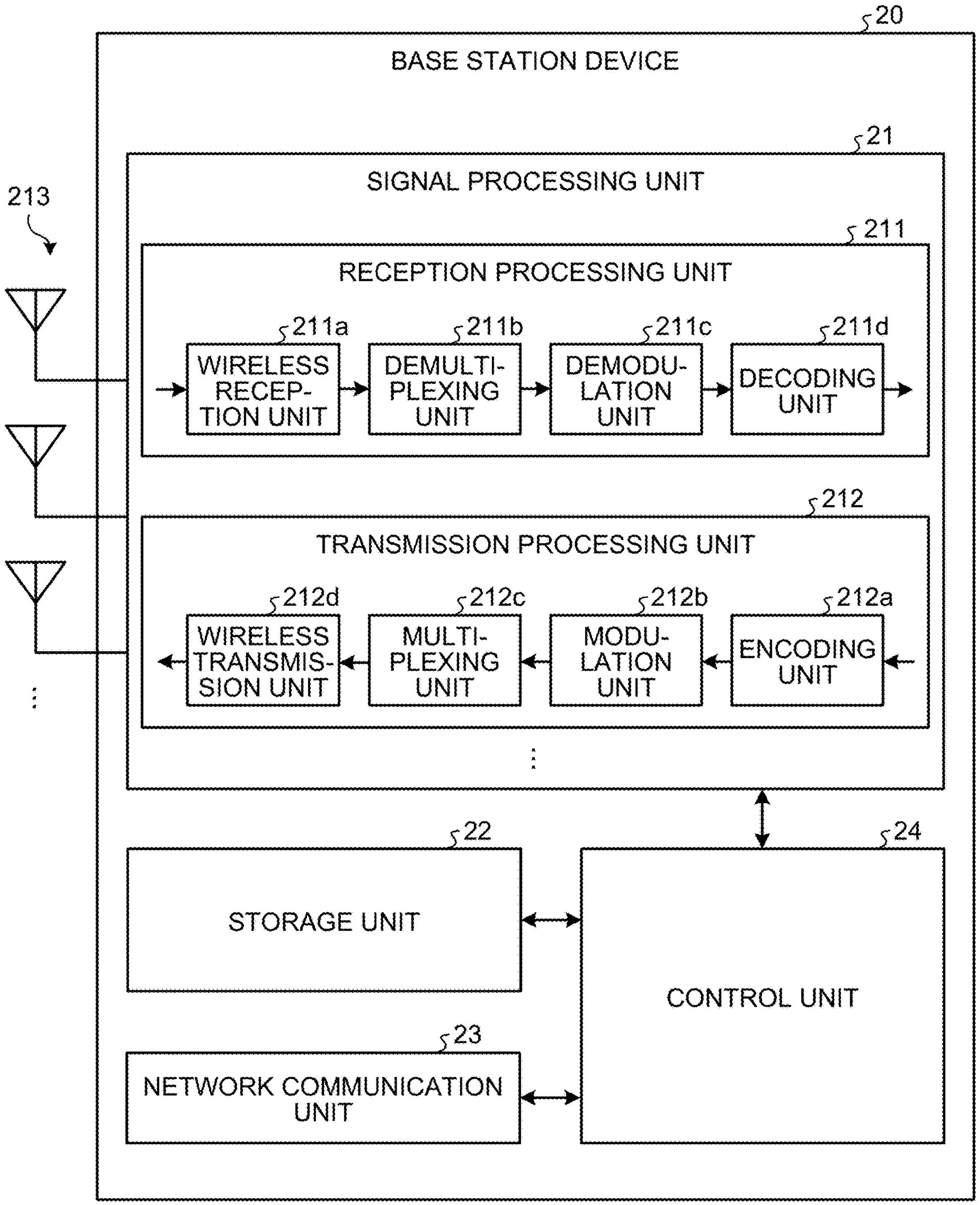
FIG. 13 is a diagram illustrating a configuration example of a base station device according to the embodiment of the disclosure.

Next, the configuration of a base station device 20 will be described. FIG. 13 is a diagram illustrating a configuration example of the base station device 20 according to the embodiment of the disclosure. The base station device 20 is a communication device (radio system) that wirelessly communicates with a terminal device 40. The base station device 20 is a type of information processing devices.

The base station device 20 includes a signal processing unit 21, a storage unit 22, a network communication unit 23, and a control unit 24. Note that the configuration illustrated in FIG. 13 is a functional configuration, and the hardware configuration may be different from this. Furthermore, the functions of the base station device 20 may be implemented in a distributed manner in a plurality of physically separated devices.

The signal processing unit 21 is a wireless communication interface for wirelessly communicating with another communication device (for example, a terminal device 40 or another base station device 20). The signal processing unit 21 is a wireless transceiver that operates under the control of the control unit 24. The signal processing unit 21 may support a plurality of radio access schemes. For example, the signal processing unit 21 may support both NR and LTE. The signal processing unit 21 may support other cellular communication schemes such as W-CDMA or cdma2000. Furthermore, the signal processing unit 21 may support a wireless LAN communication scheme in addition to the cellular communication schemes. Of course, the signal processing unit 21 may support only one radio access scheme.

The signal processing unit 21 includes a reception processing unit 211, a transmission processing unit 212, and antennas 413. The signal processing unit 21 may include a plurality of reception processing units 211, a plurality of transmission processing units 212, and a plurality of antennas 413. Note that, in a case where the signal processing unit 21 supports a plurality of radio access schemes, the units of the signal processing unit 21 can be separately configured for each of the radio access schemes. For example, if the base station device 20 supports NR and LTE, a pair of the reception processing unit 211 and the transmission processing unit 212 may be configured for NR and LTE separately.

The reception processing unit 211 processes an uplink signal received via an antenna 413. The reception processing unit 211 includes a wireless reception unit 211*a*, a demultiplexing unit 211*b*, a demodulation unit 211*c*, and a decoding unit 211*d*.

The wireless reception unit 211*a* performs, on an uplink signal, down-conversion, removal of an unnecessary frequency component, control of the amplification level, quadrature demodulation, conversion to a digital signal, removal of a guard interval, extraction of a frequency domain signal by fast Fourier transform, and others. For example, let us presume that the radio access scheme of the base station device 20 is a cellular communication scheme such as LTE. In this example, the demultiplexing unit 211*b* demultiplexes an uplink channel such as the physical uplink shared channel (PUSCH) or the physical uplink control channel (PUCCH) and an uplink reference signal from a signal output from the wireless reception unit 211*a*. The demodulation unit 211*c* demodulates the reception signal using a modulation scheme such as binary phase shift keying (BPSK) or quadrature phase shift keying (QPSK) on a modulation symbol of the uplink channel. The modulation scheme used by the demodulation unit 211*c* may be M-ary quadrature amplitude modulation (QAM) such as 16QAM, 64QAM, or 256QAM. The decoding unit 211*d* performs decoding processing on the demodulated encoded bits of the uplink channel. The decoded uplink data and uplink control information are output to the control unit 24.

The transmission processing unit 212 performs transmission processing of downlink control information and downlink data. The transmission processing unit 212 includes an encoding unit 212*a*, a modulation unit 212*b*, a multiplexing unit 212*c*, and a wireless transmission unit 212*d*.

The encoding unit 212*a* encodes downlink control information and downlink data input from the control unit 24 using an encoding scheme such as block encoding, convolutional encoding, or turbo encoding. The modulation unit 212*b* modulates coded bits output from the encoding unit 212*a* by a predetermined modulation scheme such as BPSK, QPSK, 16QAM, 64QAM, or 256QAM. The multiplexing unit 212*c* multiplexes a modulation symbol and a downlink reference signal of each channel and allocates the multiplexed symbols in predetermined resource elements. The wireless transmission unit 212*d* performs various types of signal processing on the signal from the multiplexing unit 212*c*. For example, the wireless transmission unit 212*d* performs processing such as conversion into the time domain by fast Fourier transform, addition of a guard interval, generation of a baseband digital signal, conversion into an analog signal, quadrature modulation, up-conversion, removal of an undesired frequency component, or power amplification. The signal generated by the transmission processing unit 212 is transmitted from an antenna 413.

The storage unit 22 is a storage device capable of reading and writing data, such as a DRAM, an SRAM, a flash memory, or a hard disk. The storage unit 22 functions as a storage means of the base station device 20.

The network communication unit 23 is a communication interface for communicating with other devices (for example, other base station devices 20). For example, the network communication unit 23 is a local area network (LAN) interface such as a network interface card (NIC). The network communication unit 23 may be a universal serial bus (USB) interface including a USB host controller, a USB port, and the like. In addition, the network communication unit 23 may be a wired interface or a wireless interface. The network communication unit 23 functions as a network communication means of the base station device 20. The network communication unit 23 communicates with other devices under the control by the control unit 24.

The control unit 24 is a controller that controls each of the units of the base station device 20. The control unit 24 is implemented by, for example, a processor such as a central processing unit (CPU) or a micro processing unit (MPU). For example, the control unit 24 is implemented by the processor executing various programs stored in a storage device inside the base station device 20 using a random access memory (RAM) or the like as a work area. Note that the control unit 24 may be implemented by an integrated circuit such as an application specific integrated circuit (ASIC) or a field programmable gate array (FPGA). Any of the CPU, the MPU, the ASIC, and the FPGA can be deemed as a controller.

Configuration Example of Terminal Device

Figure 14:
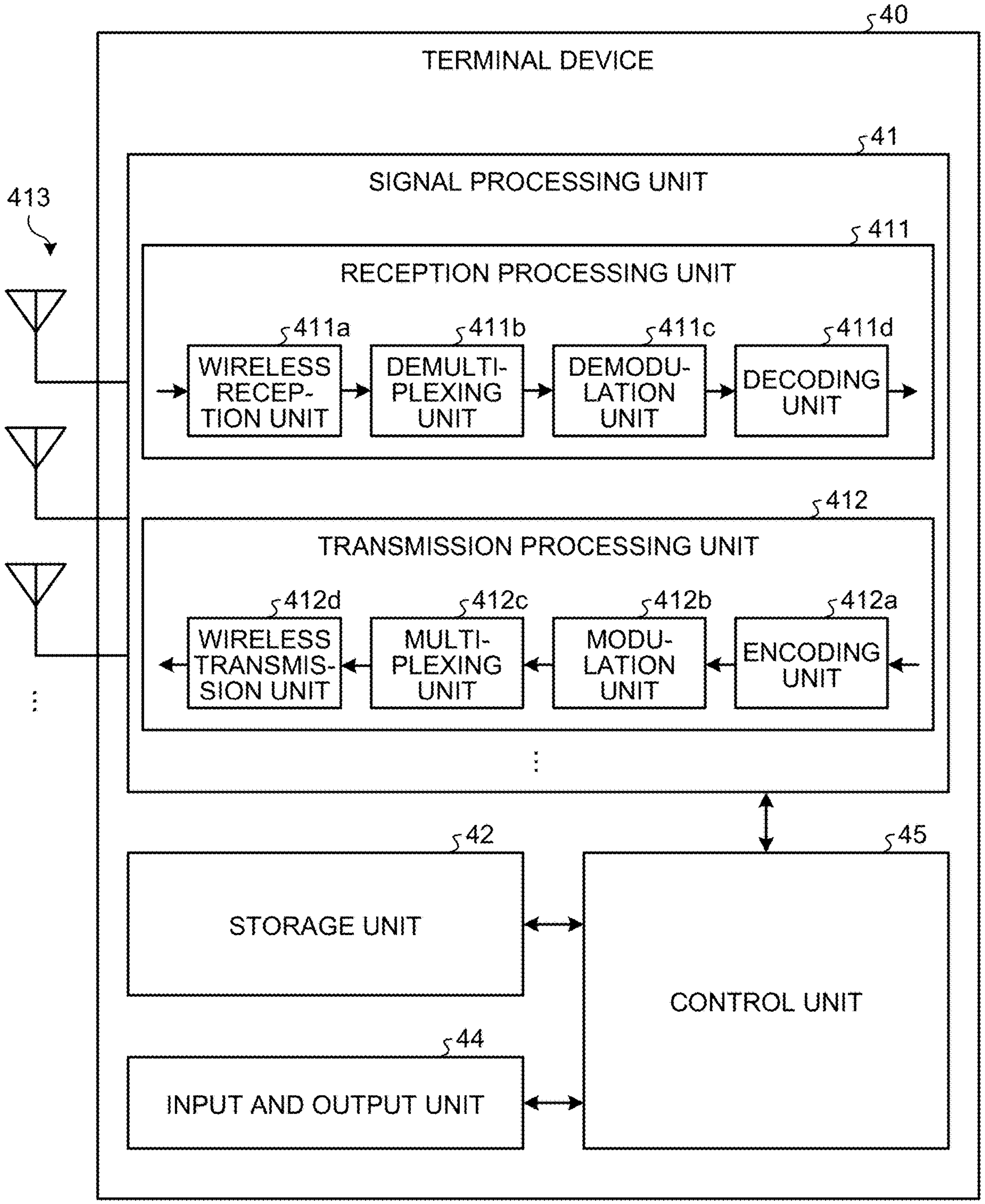
FIG. 14 is a diagram illustrating a configuration example of a terminal device according to the embodiment of the disclosure.

Next, the configuration of a terminal devices 40 will be described. FIG. 14 is a diagram illustrating a configuration example of a terminal device 40 according to the embodiment of the disclosure. The terminal device 40 is a communication device (radio system) that performs wireless communication with a base station device 20. The terminal device 40 is a type of information processing devices.

The terminal device 40 includes a signal processing unit 41, a storage unit 42, an input and output unit 44, and a control unit 45. Note that the configuration illustrated in FIG. 14 is a functional configuration, and the hardware configuration may be different from this. Furthermore, the functions of the terminal device 40 may be implemented in a distributed manner to a plurality of physically separated configurations.

The signal processing unit 41 is a wireless communication interface for wirelessly communicating with another communication device (for example, a base station device 20 or another terminal device 40). The signal processing unit 41 is a wireless transceiver that operates under the control of the control unit 45. The signal processing unit 41 supports one or a plurality of radio access schemes. For example, the signal processing unit 41 supports both NR and LTE. The signal processing unit 41 may support other radio access schemes such as W-CDMA or cdma2000.

The signal processing unit 41 includes a reception processing unit 411, a transmission processing unit 412, and an antenna 313. The signal processing unit 41 may include a plurality of reception processing units 411, a plurality of transmission processing units 412, and a plurality of antennas 313. Note that, in a case where the signal processing unit 41 supports a plurality of radio access schemes, the units of the signal processing unit 41 can be separately configured for each of the radio access schemes. For example, a pair of the reception processing unit 411 and the transmission processing unit 412 may be configured for LTE and NR separately. The configurations of the reception processing unit 411 and the transmission processing unit 412 are similar to those of the reception processing unit 211 and the transmission processing unit 212 of the base station device 20.

The storage unit 42 is a storage device capable of reading and writing data, such as a DRAM, an SRAM, a flash memory, or a hard disk. The storage unit 42 functions as a storage means of the terminal device 40.

The input and output unit 44 is a user interface for exchanging information with a user. For example, the input and output unit 44 is an operation device for the user to perform various operations, such as a keyboard, a mouse, operation keys, or a touch panel. In addition, the input and output unit 44 is a display device such as a liquid crystal display or an organic electroluminescence (EL) display. The input and output unit 44 may be an acoustic device such as a speaker or a buzzer. Furthermore, the input and output unit 44 may be a lighting device such as a light emitting diode (LED) lamp. The input and output unit 44 functions as an input and output means (input means, output means, operation means, or notification means) of the terminal device 40.

The control unit 45 is a controller that controls each of the units of the terminal device 40. The control unit 45 is implemented by a processor such as a CPU or an MPU. For example, the control unit 45 is implemented by the processor executing various programs stored in the storage device inside the terminal device 40 using a RAM or the like as a work area. Note that the control unit 45 may be implemented by an integrated circuit such as an ASIC or an FPGA. Any of the CPU, the MPU, the ASIC, and the FPGA can be deemed as a controller.

Technical Features

<Synchronization Boundary>

Hereinafter, the definition of the sync boundary in the present embodiment will be described.

A sync boundary is common timing shared at least among wireless communication devices supporting synchronous access. Examples of a defining method and a configuration method of the sync boundary for the wireless communication devices include the following.

As an example of the defining method of the sync boundary synch, the sync boundary is defined in association with timing defined in standards. Note that, in the present example, it is based on the premise that the wireless communication devices are synchronized (aligned in terms of timing) with each other in communication frames (radio frame, half frame, subframe, or slot level), however, it is not limited thereto. For example, the synchronization boundary may have been synchronized at the symbol (namely, OFDM symbol) level.

As a specific example of the defining method of the sync boundary, the sync boundary is defined as a boundary of a half-frame. As an example, a sync boundary is set at the start position of a subframe #0 or a subframe #5 of a downlink. As another example, a sync boundary is set at the start position of a subframe #0 or a subframe #5 of the base station device 20. In this example, the sync boundary in 3GPP is defined by a period of 5 milliseconds that is the length of the half frame.

As a specific example of the defining method of the sync boundary, the sync boundary is set in a period of six subframes starting from a 0th system frame number (SFN). As an example, the head of a subframe satisfying mod (SFN*10+subframe number, 6)=0 is defined as the sync boundary. Note that mod (A, B) is a mathematical expression representing a remainder obtained after A is divided by B.

As a specific example of the defining method of the sync boundary, the sync boundary is set by the global time. For example, the sync boundary is defined by a time defined by the coordinated universal time (UTC). For example, timing satisfying mod (UTC, 6 ms)=0 is defined as the sync boundary.

Note that at least one of a timing advance value or subcarrier spacing may be considered for the sync boundary. For example, a timing advance value to be applied to a wireless terminal may be vary depending on a distance from the base station or the propagation environment. Different timing advance values may result in different frame boundaries in terms of transmission timing of the wireless terminal. Therefore, a timing advance value may be considered so that the sync boundaries are accurately time-synchronized among a plurality of terminals. Additionally or alternatively, subcarrier spacing may be considered for the sync boundary. The number of slots in the time axis direction may vary depending on the subcarrier spacing. Therefore, in a case where the sync boundary is specified by the slot number or the number of slots, the slot number or the number of slots specifying the sync boundary may be different for each subcarrier spacing so that the sync boundaries are temporally synchronized among a plurality of wireless terminals.

An example of the configuration method of the sync boundary includes a configuration method by semi-static signaling. Examples of the semi-static signaling include master information block (MIB), system information block (SIB), dedicated RRC signaling (for example, RRCSetup message or RRCReconfiguration message), and others. The sync boundary is set on the basis of configuration information that is included in the semi-static signaling and specifies timing of the sync boundary. An example of the configuration information for specifying the timing of the sync boundary includes, for example, a period and an offset. As an example, the head of a subframe satisfying mod (SFN*10+subframe number+Y, X)=0 is defined as the sync boundary. In this example, X represents a period, Y represents an offset, and these values are set from upper layers.

Note that the period or the offset may not be set by semi-static signaling. In this case, a default value is applied for the period and the offset. As an example, a default value of the period is 6, and a default value of the offset is 0.

Note that the base station device 20 can acquire an MIB and/or an SIB transmitted from a base station device 20 of another operator. As a result, even between different operators, configuration information can be exchanged between the base station devices 20 using the information of the MIB and/or the SIB. Details of the configuration information exchanged between the base station devices 20 will be described later.

Note that the configuration information for specifying the timing of the sync boundary may also be used as other configuration information. Examples of other configuration information include downlink physical channel or occasion configuration information of downlink physical signals, configuration information of the idle period, transmission stop timing of the physical channel and/or physical signal, end timing information of the maximum COT, TDD-UL-DL configuration, RACH occasion configuration information, and others.

A specific example of the occasion of the downlink physical channel or the downlink physical signal includes a PDCCH monitoring occasion. For example, a boundary of slots of a PDCCH monitoring occasion in which terminal group-common DCI (e.g. DCI format 2_0) can be transmitted is set as a sync boundary.

A specific example of the occasion of the downlink physical channel or the downlink physical signal includes a period of an SS/PBCH block. For example, a boundary of slots including the SS/PBCH block with a 0th index is set as a sync boundary.

An example of the configuration method of the sync boundary includes a configuration method by dynamic signaling. Examples of the dynamic signaling include DCI, MAC CE, and others. The sync boundary is set on the basis of information (field or parameter) specifying the timing of the sync boundary included in the dynamic signaling.

Those presumed as the information specifying the timing of the sync boundary include a length from a slot in which the information is received to a slot of the sync boundary, a terminal position of the COT, a length of the remaining COT, an instruction to stop transmission, a start position of the idle period, information regarding whether or not to extend the COT, a channel access type (information indicating the type 1 channel access or the type 2 channel access), the period and the offset, SFN and/or a slot number, and others.

The information specifying the timing of the sync boundary may be information separate for each of the terminal devices 40 but is preferably common to a terminal group. In a case where the information is transmitted as information common to a terminal group, a terminal group-common PDCCH (terminal group-common DCI) is used. Note that a DCI format including the information specifying the timing of the sync boundary may be defined to be included in at least one of the existing Format 0_0, Format 0_1, Format 1_0, Format 1_1, Format 2_0, Format 2_1, Format 2_2, or Format 2_3, or a new DCI format may be defined for the synchronous access, and the information specifying the timing of the sync boundary may be included in DCI using the new format for the synchronous access.

Note that sync boundaries of different periods may be set to wireless communication devices. Specifically, a sync boundary of a period of six milliseconds may be set to a certain wireless communication device, whereas a sync boundary of a period of twelve milliseconds may be set to another wireless communication device. Specifically, a sync boundary of a short period is set to a wireless communication device that performs low-delay communication, and a sync boundary of a long period is set to a wireless communication device that performs communication in which a delay is acceptable. Examples of the wireless communication device that performs low-delay communication include a wireless communication device in which a priority index is set in the physical channel.

<Operation of Wireless Communication Device at Synchronization Boundary>

A COT acquired by a wireless communication device to which synchronous access is applied does not exceed the next sync boundary or a sync boundary after the next sync boundary from the timing at which the COT has been acquired. The wireless communication device to which the synchronous access is applied does not transmit an uplink physical channel or an uplink physical signal beyond the next sync boundary or the sync boundary after the next sync boundary from the timing at which the COT has been acquired. In other words, the wireless communication device to which synchronous access is applied stops transmission of the uplink physical channel and the uplink physical signal at the next sync boundary or the sync boundary after the next sync boundary. Alternatively, the wireless communication device to which synchronous access is applied may be configured to stop transmission of the uplink physical channel and the uplink physical signal by the next sync boundary or the sync boundary after the next sync boundary.

For example, it is based on the premise that, in a terminal device 40, a COT ends at a sync boundary. Even in a case where transmission after a sync boundary is instructed by DCI or RRC configuration, the terminal device 40 stops transmission of the uplink physical channel and the uplink physical signal. As for the instruction for transmission after the sync boundary, the terminal device 40 performs channel access again and acquires the COT again. Alternatively, the terminal device 40 may be configured to ignore the instruction for transmission after the sync boundary. Specific examples of the instruction of transmission beyond the sync boundary include multi-slot scheduling (multi-transmission time interval (TTI)) scheduling or multi-PDSCH/PUSCH scheduling), repeated transmission (repetition or slot aggregation), and others. In a case where these transmission instructions are assigned across the sync boundary, transmission after the sync boundary is not performed. Note that a generated PUSCH or PUCCH is preferably dropped, however, a PUSCH or PUCCH generated with a COT obtained later may be transmitted.

The sync boundary at which the COT ends is determined by whether or not to perform COT extension. In a case where COT extension is not performed, at the next sync boundary from the timing at which the COT has been acquired, the conditions for and determination of COT extension will be described later in detail.

<Conditions for COT Extension>

From the viewpoint of fairness of the channel occupancy time with asynchronous access, the COT of a wireless communication device to which synchronous access is applied can be extended. In synchronous access, in a case where a predetermined condition is satisfied, the wireless communication devices (base station devices 20 and terminal devices 40) can perform COT extension.

For example, in a case where one or more of the following conditions are satisfied, a wireless communication device can extend a COT.

(1) a Case where it is not Guaranteed that No Wireless Communication Devices of Radio Access Technology (Rat) Other than the 3GPP, to which Asynchronous Access is Applied, are Present for a Long Period of Time (for Example, Under the Law)

In a case where it cannot be guaranteed that no wireless communication devices of asynchronous access are present under the law, the wireless communication devices operate on the premise that there is an asynchronous access. Examples of the RAT other than 3GPP to which asynchronous access is applied include the wireless LAN and IEEE 802.11.

(2) a Case where Another Wireless Communication Device to which Synchronous Access is Applied but not Synchronized is Detected Even in a wireless communication device to which synchronous access is applied, in a case where the wireless communication device is not synchronized among wireless communication devices, it is difficult to adjust the COT acquisition timing of the synchronous access. Therefore, another wireless communication device to which synchronous access is applied but not synchronized can be deemed as a wireless communication device of asynchronous access, whereby COT extension can be performed.

(3) a Case where the Sync Boundary and the Start Timing of the COT are Separated from Each Other by a Certain Period of Time or More In a case where the sync boundary and the COT acquisition and start timing are separated from each other by a certain period of time or more, a possibility is assumed that the COT acquisition at the sync boundary has been hindered by transmission from asynchronous access. Even in this case, the wireless communication device of synchronous access can perform COT extension in order to maintain fairness of the channel occupancy time with a wireless communication device of asynchronous access.

The certain period of time may be a predetermined period of time or a period of time set from another wireless communication device. Examples of the predefined time include a contention window size, the maximum contention window size, or the minimum contention window size of the wireless communication device, the idle period, timing at which transmission can be started, and others. Examples of the time set from the other wireless communication device include a period (the number of symbols, the number of slots, or a time defined in microseconds) specified from the base station device 20 by SIB or RRC signaling, a period from the sync boundary to transmission start timing specified by DCI, a period shared by another base station device 20 by the X2 interface or the Xn interface, a period set from the core network (EPC or 5GC) by the S1 interface or the NG interface, and others.

(4) a Case where COT Extension Permission Information is Acquired from Another Wireless Communication Device Sharing the COT In a case where another wireless communication device has the right to determine COT extension, information indicating whether or not COT extension is possible is transmitted to the wireless communication device to which synchronous access is applied. In a case where the information indicating that COT extension is possible is received, the wireless communications device can perform COT extension.

As an example, in a case where the wireless communication device is a responding device and has received COT extension permission information from an initiating device, the wireless communication device can perform COT extension.

(5) Case where LBT after Sync Boundary Fails

In a case where LBT performed after a sync boundary fails (namely, in a case where busy is detected in a CCA slot), a possibility is assumed that transmission of a wireless communication device of asynchronous access is the cause. In this case, the wireless communication device of synchronous access can perform COT extension.

(6) a Case where it is Detected that Another Wireless Communication Device Occupies the Channel at the Timing of a Sync Boundary In a case where a transmission signal of another wireless communication device is detected at the timing of a sync boundary, the wireless communication device of synchronous access can perform COT extension. A method of detecting a signal from the other wireless communication device may be CCA or a signal detection method different from the CCA (for example, a decoding-based detection method).

As a specific example, in a case where the channel is not occupied by transmission from the other wireless communication device at the timing of the sync boundary and the COT has been successfully acquired at the timing of the sync boundary as a CCA result at the sync boundary, the maximum COT of the wireless communication device to which synchronous access is applied is set as one period (for example, six milliseconds) of the sync boundary. On the other hand, in a case where the channel is occupied by transmission from the other wireless communication device at the timing of the sync boundary and the COT has been successfully acquired at timing other than the sync boundary as a CCA result at the sync boundary, the maximum COT of the wireless communication device to which synchronous access is applied can be set to two periods (for example, twelve milliseconds) of the sync boundary.

(7) a Case where Notification that Another Wireless Communication Device is Scheduled to Continue to Occupy the Channel after the Next Sync Boundary is Made In a case where another wireless communication device is scheduled to continue to occupy the COT even after the next sync boundary, there is a possibility that the COT is acquired at timing other than the sync boundary. In this case, the wireless communication device of synchronous access can perform COT extension.

<Determination of COT Extension>

COT extension can be applied in a case where one of the above conditions is satisfied. However, even if the above-described conditions are satisfied, it is also conceivable that there is a case where the communication efficiency is improved by not performing COT extension. For example, by ending the COT at earlier timing, synchronizing nodes can perform LBT at next sync boundary timing and perform simultaneous transmission. Therefore, a wireless communication device can select whether or not to perform COT extension.

Figure 15:
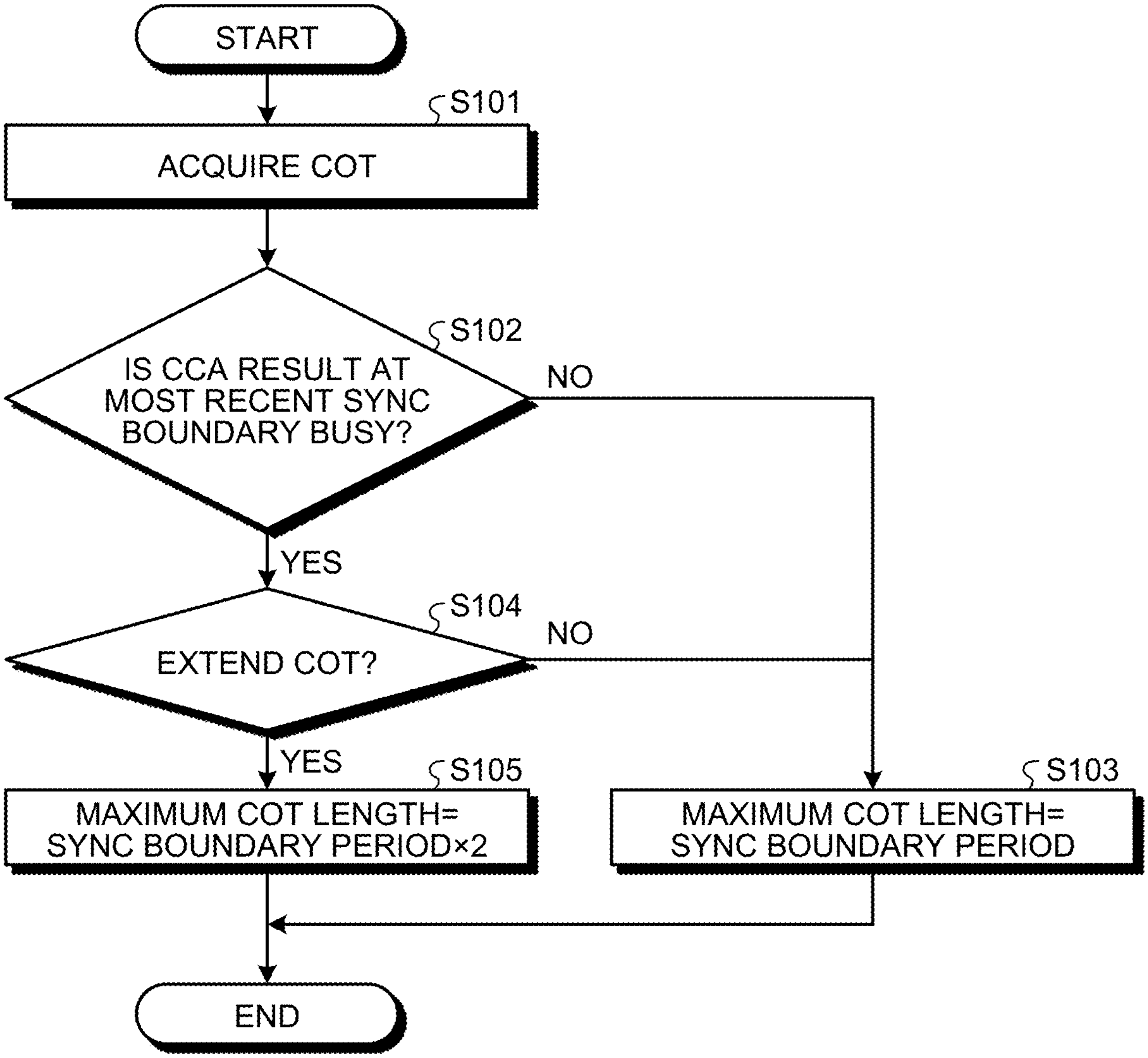
FIG. 15 is a flowchart illustrating an example of processing of determining COT extension according to the embodiment of the disclosure.

FIG. 15 is a flowchart illustrating an example of processing of determining COT extension according to the embodiment of the disclosure.

As illustrated in FIG. 15, a wireless communication device performs LBT and acquires the COT (Step S101). After acquiring the COT, the wireless communication device checks the CCA result at an immediately preceding sync boundary and determines whether or not the result is busy (Step S102).

If the CCA result at the immediately preceding sync boundary is clear and is not busy (Step S102: No), the maximum COT is set to the period (for example, six milliseconds) of the sync boundary (Step S103). On the other hand, if the CCA result at the immediately preceding sync boundary is busy (Step S102: Yes), it is determined whether or not COT extension is actually performed (Step S104).

If it is determined that the COT is not extended (Step S104: No), the flow proceeds to Step S103, and the wireless communication device sets the maximum COT to the period (for example, six milliseconds) of the sync boundary and releases the channel occupancy at the next sync boundary. On the other hand, if it is determined that the COT is extended (Step S104: Yes), the maximum COT is set to twice the period of the sync boundary (for example, twelve milliseconds) (Step S105), and the channel is occupied beyond the next sync boundary.

Hereinafter, COT extension in a base station device-initiated COT (gNB-initiated COT) and a terminal device-initiated COT (UE-imitated COT) will be described.

<COT Extension of Base Station Device-Initiated COT>

Whether or not to extend a base station device-initiated COT can be determined by the base station device 20.

As an example, the base station device 20 always extends a base station device-initiated COT that can be extended. That is, under a condition under which COT extension is possible, the base station device 20 always continues transmission up to the next sync boundary.

As another example, the base station device 20 determines whether or not to perform COT extension on the basis of a condition as to whether or not COT extension is actually performed in addition to the above-described condition as to whether or not COT extension is possible.

An example of the condition as to whether or not COT extension is actually performed is scheduling information. In a case where a condition under which COT extension is possible is satisfied, the base station device 20 determines whether or not to extend the COT on the basis of the scheduling information of the base station device 20 and/or another base station device 20.

Another example of the condition as to whether or not to actually perform COT extension is the sync boundary number. Specifically, COT extension is not performed at predetermined sync boundaries (for example, odd-numbered sync boundaries), and COT extension is performed at the other sync boundaries (for example, even-numbered sync boundaries). In other words, COT extension is performed at a sync boundary satisfying mod (sync boundary number, 2)=0.

Another example of the condition as to whether or not to actually perform COT extension is a request from another base station device 20. The base station device 20 determines whether or not to extend the COT on the basis of the request from the other base station device 20 requesting simultaneous transmission with respect to the base station device-initiated COT which can be extended. The request is sent, for example, by the X2/Xn interface. In a case where accepting the request from the other base station device 20, the base station device 20 performs COT extension at predetermined sync boundaries.

The request from the other base station device 20 may be dynamically indicated or may be semi-statically set. As an example of the dynamic request, COT extension is performed at a sync boundary immediately after the timing when the request has been received. As an example of the semi-static request, a number of a predetermined sync boundary may be specified, and COT extension may be performed at the predetermined sync boundary.

Another example of the condition as to whether or not to actually perform COT extension is the surrounding environment measured by the base station device 20 and/or the terminal device 40. The base station device 20 determines whether or not to extend the COT on the basis of the situation of the surrounding environment measured by the base station device 20 and/or the terminal device 40 with respect to a base station device-initiated COT which can be extended. In the situation determination of the surrounding environment measured by the base station device 20 and/or the terminal device 40, for example, a result of HARQ-ACK, information of CSI feedback, time average RSSI, the channel occupancy, a result of LBT, detection of a Wi-Fi preamble, and others are used. Information regarding the surrounding environment measured by the terminal device 40 (HARQ-ACK for PDSCH, CSI, RSRQ, RSSI, channel occupancy, and others) is reported to the base station device 20.

<COT Extension of Terminal Device-Initiated COT>

(Terminal Device 40 Determines COT Extension of Terminal Device-Initiated COT)

As an example, whether or not to extend a terminal device-initiated COT (UE-initiated COT) can be determined by the terminal device 40.

As a specific example, the terminal device 40 always performs COT extension if COT extension is possible. That is, under a condition under which COT extension is possible, the terminal device 40 always continues transmission up to the next sync boundary.

As another specific example, the terminal device 40 does not perform COT extension regardless of whether or not COT extension is possible. That is, the maximum COT of the terminal device 40 is the period of the sync boundary.

As another specific example, the terminal device 40 determines whether or not to extend the COT in accordance with RRC signaling configuration from the base station device 20. The base station device 20 can control COT extension operation of the terminal device 40. In a case where the base station device 20 does not permit the terminal device 40 to perform COT extension, the terminal device 40 stops transmission at the next sync boundary regardless of the COT start timing. On the other hand, in a case where the base station device 20 permits the terminal device 40 to extend the COT, the terminal device 40 can extend the COT depending on the COT start timing.

As another specific example, the terminal device 40 determines whether or not to extend the COT on the basis of the surrounding communication environment. The surrounding communication environment is, for example, information of an interference amount.

Specific examples of the information of the interference amount include CQI, SINR, RSRQ, and RSSI. For example, in a case where the COI, the SINR, the RSRQ, or the RSSI is smaller than a predetermined value (threshold), it can be determined that the interference amount is large. In a case where the interference amount is large, it is likely that another wireless communication device is present in the surroundings. In this case, the COT is not extended since it is preferable to shorten the period in which there is interference with other wireless communication devices. On the other hand, in a case where the CQI, the SINR, the RSRQ, or the RSSI is larger than a predetermined value (threshold), it can be determined that the interference amount is small. In this case, there is a low possibility of causing interference to other wireless communication devices even when transmission is performed for a long period of time, and thus the COT can be extended.

As an example, the terminal device 40 determines whether or not to perform COT extension on the basis of configured CG-PUSCH resources. In a case where the configured consecutive CG-PUSCH resources are configured across a sync boundary, the terminal device 40 may perform COT extension to transmit PUSCH.

As an example, the terminal device 40 determines whether or not to perform COT extension on the basis of the uplink traffic volume. The terminal device 40 performs COT extension in a case where the uplink traffic (buffer) is remaining and does not perform COT extension in a case where the uplink traffic (buffer) is not remaining.

Meanwhile, the terminal device 40 does not perform determination on COT extension for the base station device-initiated COT (gNB-initiated COT) described above.

(Base Station Device 20 Determines COT Extension of Terminal Device-Initiated COT)

As another example, the base station device 20 can determine COT extension for a terminal device-initiated COT (UE-initiated COT). The base station device 20 determines whether or not to extend the COT on the basis of information acquired from the terminal device 40. First, the terminal device 40 that has acquired the COT notifies the base station device 20 that the COT has been acquired. Furthermore, the base station device 20 is notified of information used for determination of COT extension.

The information used for determination of COT extension includes information regarding the acquired COT and information regarding a condition under which COT extension is possible. Specific examples of the information used for determination of COT extension include information regarding a CCA result at the sync boundary (information indicating busy or idle), information regarding the timing at which the COT has been acquired, information regarding timing at which transmission has been started, information regarding the maximum COT, a channel access priority class (CAPC), and others.

The information used for determination of COT extension may be included in, for example, COT sharing information and notification thereof is made. Specifically, the information used for determination of COT extension may be jointly coded with other information (resource information of the terminal device COT shared with base station device 20 and CAPC) of which notification is made by the COT sharing information. The combination of values by the joint coding may be defined by default or may be set by RRC signaling.

Table 6 is an example of the COT sharing information including information of the CCA result at the sync boundary. As the information used for determination of COT extension, for the index as shown in Table 6, other information (offset information to a resource in which downlink is valid ($O_{DL}$), a length of the resource in which the downlink is valid ($L_{DL}$), and CAPC) and the value of the CCA result at the sync boundary are set. In this example, in a case where the CCA result at the sync boundary is busy and the available downlink resource (available DL resource) is longer than the period of the sync boundary (for example, six milliseconds), the base station device 20 can determine whether or not to extend the terminal device-initiated COT.

TABLE 6

| COT sharing information including information used for determination of COT extension | | | | |
|---|---|---|---|---|
| Index | $O_{DL}$ (slots) | $L_{DL}$ (slots) | CAPC | CCA result at sync boundary |
| 0 | 5 | 2 | 3 | Busy |
| 1 | 2 | 4 | 3 | Clear |
| 2 | 6 | 2 | 4 | Clear |
| 3 | 2 | 8 | 4 | Busy |

Table 7 is an example of the COT sharing information not including information of the CCA result at the sync boundary. In this example, in a case where the available downlink resource (available DL resource) is longer than the period of the sync boundary (for example, six milliseconds), the base station device 20 can determine whether or not to extend the terminal device-initiated COT.

TABLE 7

| COT sharing information including information used for determination of COT extension | | | |
|---|---|---|---|
| Index | $O_{DL}$ (slots) | $L_{DL}$ (slots) | CAPC |
| 0 | 5 | 2 | 3 |
| 1 | 2 | 4 | 3 |
| 2 | 6 | 2 | 4 |
| 3 | 2 | 8 | 4 |

Information used for determination of COT extension is included in, for example, configured grant (CG)-uplink control information (UCI) and notification thereof is made to the base station device 20. The base station device 20 determines whether or not to extend the COT on the basis of the information included in the CG-UCI.

The base station device 20 may determine COT extension of the terminal device-initiated COT by using information regarding the surrounding environment of the terminal device 40 in addition to the information used for determination of COT extension. The base station device 20 may determine COT extension on the basis of the information regarding the surrounding environment of the terminal device 40. Specific examples of the information regarding the surrounding environment of the terminal device 40 include a result of HARQ-ACK, information of CSI feedback, time average RSSI, the channel occupancy, a result of LBT, detection of a Wi-Fi preamble, and others. Information regarding the surrounding environment measured by the terminal device 40 (HARQ-ACK for PDSCH, CSI, RSRQ, RSSI, channel occupancy, and others) is reported to the base station device 20.

<Notification of COT Extension>

A wireless communication device which can select COT extension notifies other wireless communication devices (base station device 20 and terminal device 40) of whether or not COT extension is scheduled to be performed. The other wireless communication devices can prepare the operation by receiving information regarding whether or not COT extension is scheduled to be performed. For example, the other wireless communication devices that have received the information of COT extension are aware in advance that the COT continues from the next sync boundary to the sync boundary after the next sync boundary, the operation of LBT can be skipped. As a result, the other wireless communication devices do not perform unnecessary LBT operation, which can reduce power consumption.

Notification of the information from the base station device 20 to the terminal device 40 regarding whether or not COT extension is scheduled to be performed is made by, for example, a COT indicator. In a case where notification of the length of the COT extending beyond the next sync boundary is made, the terminal device 40 can recognize that COT extension is performed. On the other hand, in a case where notification of the length of the COT not extending beyond the next sync boundary is made, the terminal device 40 recognizes that COT extension is not performed. The COT indicator is notified by terminal device group-common DCI (specifically, DCI format 2_0).

Notification of the information from the base station device 20 to the terminal device 40 regarding whether or not COT extension is scheduled to be performed is made by, for example, one-bit information indicating whether or not COT extension is scheduled to be performed. Notification of the one-bit information may be made by the terminal device group-common DCI or may be made by terminal device-specific DCI.

The notification of the information from the base station device 20 to the terminal device 40 regarding whether or not COT extension is scheduled to be performed is made by, for example, an indication of a channel access type. In a case where the type 1 channel access procedure is indicated by the indication of the channel access type for the uplink physical channel and/or uplink physical signal scheduled after the next sync boundary, the terminal device 40 can recognize that COT extension is not performed. Meanwhile, in a case where the type 2 channel access procedure is indicated, the terminal device 40 can recognize that COT extension is performed.

Notification of information from the terminal device 40 to the base station device 20 regarding whether or not COT extension is scheduled to be performed is made by, for example, COT sharing information. For example, in the COT sharing information, in a case where an offset to an available downlink resource (available DL resource) exceeds the next sync boundary, the base station device 20 can recognize that the COT is scheduled to be extended by the terminal device 40.

The notification of the information from the terminal device 40 to the base station device 20 regarding whether or not COT extension is scheduled to be performed is made by, for example, one-bit information indicating whether or not COT extension is scheduled to be performed. The notification of the one-bit information is preferably made by CG-UCI.

<Transmission Halting during COT Extension>

A wireless communication device performing COT extension can continue transmission beyond the next sync boundary. Meanwhile, in a case where a certain wireless communication device performs COT extension and continues transmission even at a COT boundary, the wireless communication device that performs synchronous access fails in LBT, and thus, even a wireless communication device that can perform simultaneous transmission loses a transmission opportunity.

Therefore, a wireless communication device that performs COT extension can halt transmission at the sync boundary. As a result, while the extended COT is maintained, other wireless communication devices can perform transmission from the sync boundary, which can improve the frequency of simultaneous transmission.

A wireless communication device that does not occupy the COT can acquire a COT by performing the type 1 channel access procedure. Meanwhile, the wireless communication device that occupies the COT but is halting the transmission can resume the transmission by performing the type 2 channel access procedure.

Figure 16:
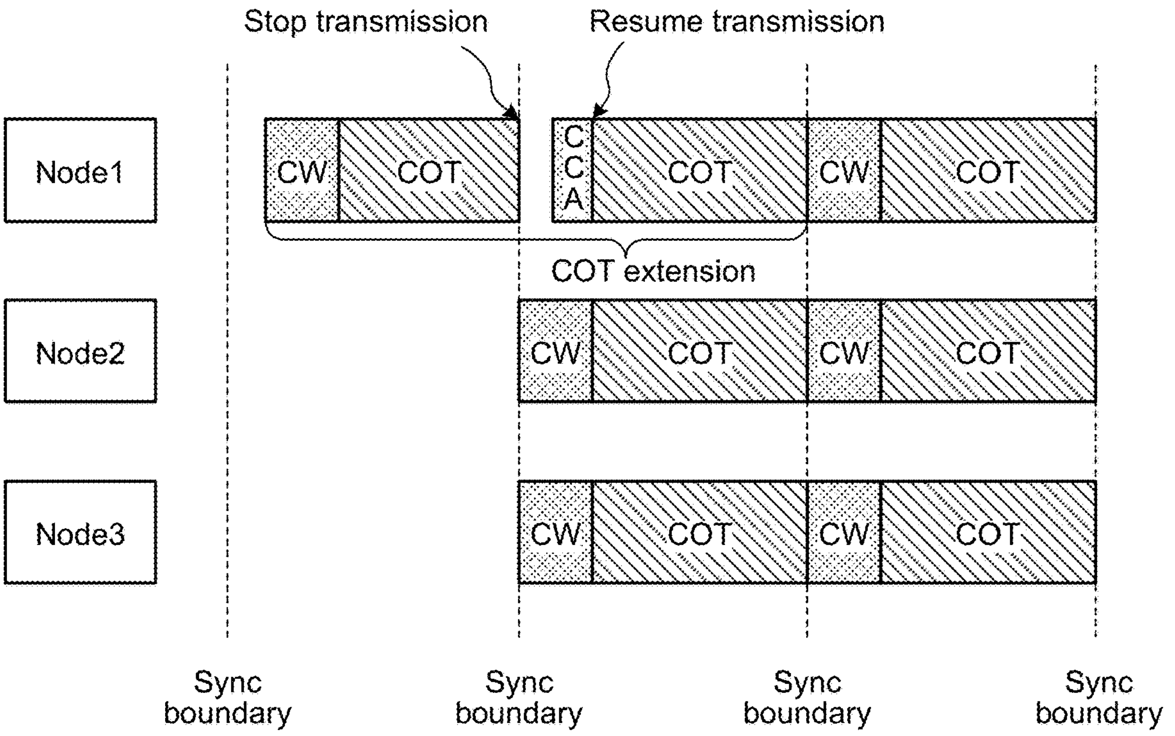
FIG. 16 is a diagram illustrating an example of transmission halting during COT extension according to the embodiment of the disclosure.

Illustrated in FIG. 16 is an example of transmission halting during COT extension. FIG. 16 is a diagram illustrating an example of transmission halting during COT extension according to the embodiment of the disclosure. A node 1 of synchronous access that satisfies a condition for COT extension can extend the COT to the sync boundary after the next sync boundary. Meanwhile, at the next sync boundary, for the success of LBT of other wireless communication devices (nodes 2 to 3 in FIG. 16), the node 1 can halt transmission while the other wireless communication devices are performing LBT (type 1 channel access procedure). Then, in a case where the node 1, which has halted the transmission, has performed LBT (type 2 channel access procedure) so as to match the transmission start timing of the other wireless communication devices and succeeded in the LBT, the node 1 can resume the transmission. As a result, it is possible to implement simultaneous transmission with the other wireless communication devices while maintaining COT extension.

The base station device 20 can instruct the terminal device 40 to halt transmission. Examples of methods of setting and instructing a halt of transmission include RRC signaling (MIB, SIB, and/or dedicated RRC signaling), MAC CE, DCI, and others.

As a specific example of the instruction to halt transmission, a period for halting transmission is set by RRC signaling. The terminal device 40, in which this setting is made, halts transmission within the period even when COT extension is performed.

As another specific example of the instruction to halt transmission, information included in the DCI indicates whether or not to halt transmission. The instruction to halt transmission may be instructed by terminal device group-common DCI (e.g. DCI format 2_0) or may be instructed by terminal device-specific DCI (e.g. DCI format 0 or DCI format 1). Notification of the instruction to halt transmission may be made together with the COT indicator, may be indicated while included in a field (ChannelAccess-CPext or ChannelAccess-CPext-CAPC) indicating a channel access type, or may be indicated by time domain resource allocation information (TDRA) of the physical channel.

The notification of the instruction to halt transmission may be made as an instruction of LBT start timing or transmission restart timing of the physical channel. The terminal device 40 in which the LBT start timing or the transmission restart timing of the physical channel is specified halts transmission from the sync boundary to specified timing.

<Sync Boundary Change Procedure>

The period and the start position of a sync boundary can be modified. In a case where a sync boundary is modified, the base station device 20 preferably notifies an adjacent base station device 20 of information regarding the modified sync boundary.

The notification to the adjacent base station device 20 may be made via a backhaul line (NG interface, Xn interface, or other backhaul line) or wirelessly while included in system information (SIB). In a case where the adjacent base station device 20 is operated by the same operator as that of the base station device 20, the notification is preferably made by a backhaul line, whereas in a case where the adjacent base station device 20 is operated by a different operator, the notification is preferably made wirelessly.

<LBT Start Timing>

In synchronous access, it is desirable to start LBT from a sync boundary. This makes it possible to avoid unnecessary LBT operation, which contributes to reduction of power consumption. Meanwhile, limiting the LBT start position reduces the frequency of channel access, thereby leading to a decrease in the communication efficiency. Therefore, the setting of the LBT start timing may be switched depending on a condition.

For example, a wireless communication device that is configured not to perform COT extension starts LBT only from a sync boundary and does not start LBT at timing other than the sync boundary.

For example, in an environment in which only wireless communication devices of synchronous access operated by the same operator are present in the same RAT, LBT is started only from a sync boundary. Meanwhile, in a case where the presence of wireless communication devices operated by different RAT or different operators are recognized, LBT can be started at times others than the sync boundary.

<Adjustment of Transmission Start Timing>

In synchronous access, it is desirable that common transmission timing is set among synchronized wireless communication devices. This enables simultaneous transmission among the synchronized wireless communication devices.

An example of a method of adjusting the transmission start timing is self-deferral. Specifically, a wireless communication device, which is about to complete or has completed LBT before the transmission start timing, holds transmission until the transmission start timing. In a case where CCA is performed once immediately before the transmission timing and the channel is clear, the wireless communication device starts transmission. In this example, the transmission start timing can be adjusted by sharing the transmission start timing among wireless communication devices.

As a method of sharing the transmission start timing, sharing by backhaul or a wireless interface, defined specific timing (for example, end of contention window or a slot boundary), and others are cited.

Another example of the method of adjusting the transmission start timing is a common CCA counter. Wireless communication devices having a common CCA counter can match the transmission start timing by matching the timing of all the CCAs. The value of the common CCA counter is shared by the backhaul, the wireless interface, and the like. Note that it is preferable in this example that the start timing of LBT is also the same and that the LBT is performed from, for example, a sync boundary.

Note that the other configuration information regarding the transmission start timing may be shared in the backhaul (such as the X2/Xn interface) among synchronized base station devices 20.

<Adjustment of Transmission Start Timing>

In synchronous access, a common contention window size is preferably applied among synchronized wireless communication devices. This can reduce unnecessary standby time in simultaneous transmission, which can reduce a channel access delay.

As an example of a method of applying a common contention window size, a fixed contention window size is used. The fixed contention window size may be defined in advance or set by information shared among the synchronized wireless communication devices.

As an example of a method of applying the common contention window size, a common contention window size calculated by using HARQ-ACKs of all PDSCHs and PUSCHs in all the synchronized wireless communication devices is used.

As an example of a method of applying the common contention window size, the minimum contention window size among the synchronized wireless communication devices is used.

As an example of a method of applying a common contention window size, the maximum contention window size among the synchronized wireless communication devices is used.

Note that the configuration information regarding the common contention window size may be shared by the backhaul (such as the X2/Xn interface) among the synchronized base station devices 20.

Note that the sync boundary may be defined as an idle period. In this case, the sync boundary is set, for example, as the head of the idle period. In the period defined as the idle period, the wireless communication device does not transmit a signal but performs LBT.

<Modification of Synchronous Access>

As a modification of the synchronous access, a wireless communication device that performs the type 1 channel access procedure and a wireless communication device that performs only the type 2 channel access procedure may be configured in a plurality of coordinated wireless communication devices (for example, base station devices 20 belonging to the same COMP cluster). The wireless communication device that performs the type 1 channel access procedure is defined as a primary wireless communication device (primary node or master node), and the wireless communication device that performs only the type 2 channel access procedure is defined as a secondary wireless communication device (secondary node or slave node).

Figure 17:
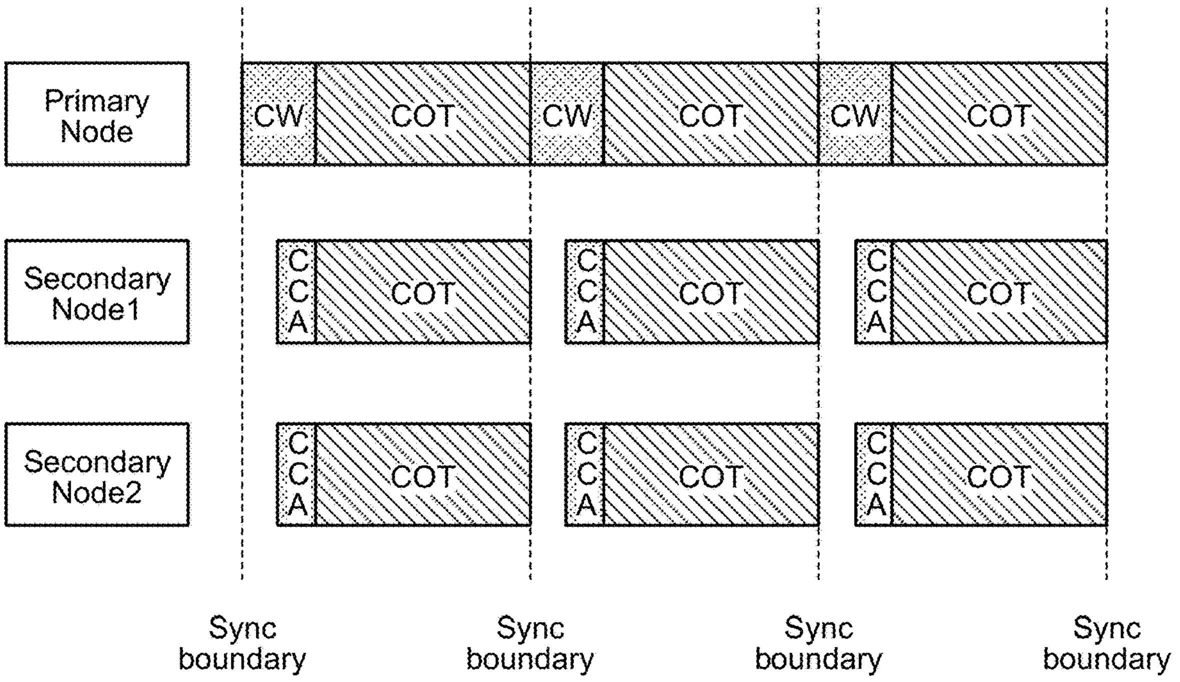
FIG. 17 is a diagram illustrating a modification of the synchronous access according to the embodiment of the disclosure.

FIG. 17 is a diagram illustrating a modification of the synchronous access according to the embodiment of the disclosure. In the present modification, a primary wireless communication device executes the type 1 channel access procedure at a sync boundary. At the timing when the type 1 channel access procedure of the primary wireless communication device is completed, a secondary wireless communication device executes the type 2 channel access procedure. With the primary wireless communication device and the secondary wireless communication device simultaneously completing the channel access procedures, simultaneous transmission is made possible. In addition, in the present modification, since the number of times of CCA execution of the secondary wireless communication device is reduced, the probability of LBT failure in the secondary wireless communication device can be reduced.

In the present modification, thresholds of power detection of the primary wireless communication device and the secondary wireless communication device may be different. Specifically, the threshold of power detection of the primary wireless communication device may be set lower than the threshold of power detection of the secondary wireless communication device. In other words, the threshold of power detection of the secondary wireless communication device may be set higher than the threshold of power detection of the primary wireless communication device. As a result, the detection range of the primary wireless communication device can be expanded, and the load of the LBT of the secondary wireless communication device can be reduced.

Also in the present example, the sync boundary, the LBT start timing or end timing, and/or the transmission start timing are preferably shared between the primary wireless communication device and the secondary wireless communication device. Information is shared among base station devices 20 by the X2 interface or the Xn interface. In a case where the secondary wireless communication device is a terminal device 40, an instruction from a base station device 20 to execute CCA, the timing of the CCA, and/or the transmission start timing may be performed by DCI.

<Modification of FBE>

As a modification of the FBE, the COT start timing can be modified to any timing. A wireless communication device performs CCA at any timing and starts a COT as long as a condition, for stopping transmission within the total time set as the idle period, is satisfied. In this modification of the FBE, by randomly changing the timing of CCA, similar effects to those of the random backoff can be exerted, which enables coexistence with wireless communication devices as LBE. This modification is also referred to as a floating COT.

Figure 18:
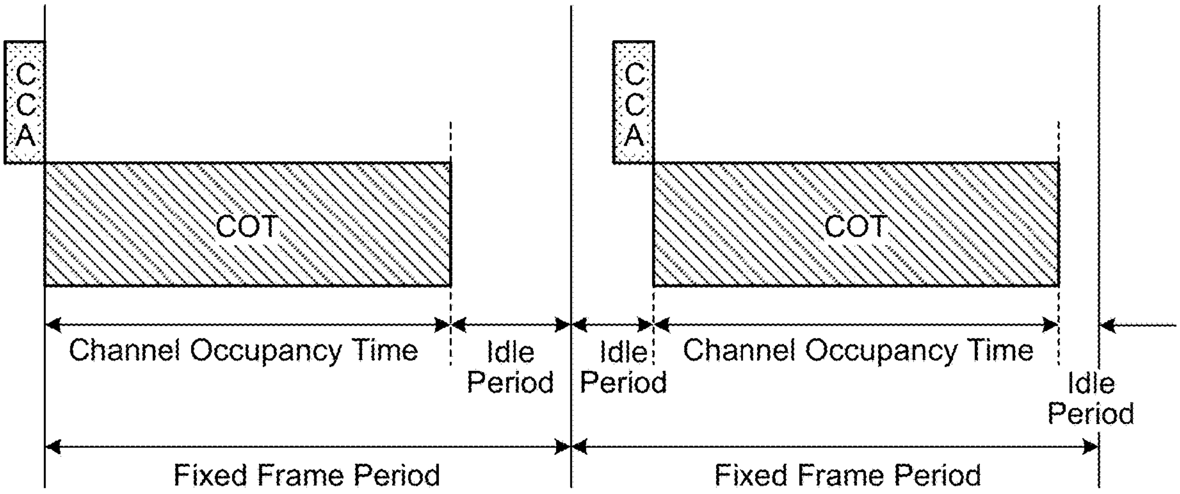
FIG. 18 is a diagram illustrating a modification of FBE according to the embodiment of the disclosure.

FIG. 18 is a diagram illustrating a modification of the FBE according to the embodiment of the disclosure. In the FBE of the related art, CCA is performed immediately before a fixed frame period. Meanwhile, in the present modification, CCA is performed not only at the boundary of the fixed frame period but also at any timing within an idle period.

In the present modification, the COT start timing, the end timing, and the position of an idle period are dynamically modified. Since a wireless communication device is not allowed to perform transmission within the idle period, a wireless communication device to which the present modification is applied needs to recognize the position of the idle period.

As an example, notification of the position of the idle period and/or the position of the COT is made by DCI. It is preferable that the notification of the position of the idle period and/or the position of the COT is made along with a COT indicator. Notification of the information regarding the position of the COT is made by, for example, the COT start timing, the COT end timing, and others. Notification of information regarding the position of the idle period is made by the start timing of the idle period, the end timing of the idle period, and/or the length of the idle period.

As another example, the position of the idle period and/or the position of the COT are recognized through detection of the physical channel and/or a physical signal. The COT start timing is recognized through detection of the physical channel and/or a physical signal transmitted at the start position of the COT. The wireless communication device can recognize the position of the idle period from the COT start timing, the set maximum COT or the COT of which notification is made by DCI, and the set length of the fixed frame period. Examples of the physical channel and/or the physical signal transmitted at the COT start position include a synchronization signal, an SS/PBCH block, a CSI-RS, a DMRS of the PDCCH, a preamble signal, and others.

<Application to Sidelink Communication>

Note that the above-described embodiment can also be applied to sidelink communication performed among terminal devices 40. For example, the above-described base station device 20 can be deemed as a terminal device 40 (also referred to as a primary terminal device or a master terminal device) that controls another terminal device 40, and the above-described terminal device 40 can be deemed as a terminal device 40 (also referred to as a secondary terminal device or a slave terminal device) controlled by another terminal device 40.

<<Modifications>>

Note that the above embodiments are examples, and various modifications and applications can be made.

For example, the control device that controls a base station device 20 and a terminal device 40 of the present embodiment may be implemented by a dedicated computer system or a general-purpose computer system.

For example, a communication program for executing the above operation is stored and distributed in a computer-readable recording medium such as an optical disc, a semiconductor memory, a magnetic tape, or a flexible disk. Moreover, for example, a control device is configured by installing the program in a computer and executing the above processing. At this point, the control device may be a device (for example, a personal computer) external to the base station device 20 and the terminal device 40. Furthermore, the control device may be an internal device (for example, the control unit 24 or the control unit 45) of the base station device 20 or the terminal device 40.

In addition, the communication program may be stored in a disk device included in a server device on a network such as the Internet so that the communication program can be downloaded to a computer. In addition, the above functions may be implemented by collaborative operation between an operating system (OS) and application software. In this case, a portion other than the OS may be stored in a medium and distributed, or a portion other than the OS may be stored in a server device to allow a computer to download it, for example.

Among the processing described in the above embodiments, all or a part of the processing described as that performed automatically can be performed manually, or all or a part of the processing described as those performed manually can be performed automatically by a known method. In addition, a processing procedure, a specific name, and information including various types of data or parameters illustrated in the above or in the drawings can be modified as desired unless otherwise specified. For example, various types of information illustrated in the drawings are not limited to the information is illustrated.

In addition, each component of each device illustrated in the drawings is conceptual in terms of function and is not necessarily physically configured as illustrated in the drawings. That is, the specific form of distribution and integration of devices is not limited to those illustrated in the drawings, and all or a part thereof can be functionally or physically distributed or integrated in any unit depending on various loads, use status, and the like. Note that this configuration by distribution and integration may be performed dynamically.

In addition, the above embodiments can be combined as appropriate as long as the processing content does not contradict each other. In addition, the order of the steps illustrated in the flowcharts of the above embodiments can be modified as appropriate.

Furthermore, for example, the present embodiment can be implemented as any configuration including a device or a system, for example, a processor such as a system large scale integration (LSI), a module using a plurality of processors or the like, a unit using a plurality of modules or the like, a set or the like (namely, some components of a device) obtained by further adding another function to a unit.

Note that, in the present embodiment, a system refers to a set of a plurality of components (devices, modules (parts), etc.), and it does not matter whether or not all the components are in the same housing. Therefore, a plurality of devices housed in separate housings and coupled via a network, and one device in which a plurality of modules is housed in one housing are both systems.

Furthermore, for example, the present embodiment can adopt a configuration of cloud computing in which one function is shared and processed by a plurality of devices in cooperation via a network.

The COT in this specification can be rephrased as a COT length. Therefore, the maximum COT can be rephrased as a maximum COT length, and the COT information can be rephrased as COT length indicator.

CONCLUSION

As described above, according to the embodiment of the present disclosure, a terminal device 40 performs time synchronization with a communication device (for example, a base station device 20 or another terminal device 40) at a sync boundary. The terminal device 40 includes a signal processing unit 41 (an example of a wireless communication unit) and a control unit 45. The control unit 45 transmits determination information for determining whether or not to extend a COT via the signal processing unit 41, receives information regarding the COT, and performs uplink transmission on the basis of the information regarding the COT that has been received. In a case where the information regarding the COT does not indicate extension of the COT, the COT ends at least by a first sync boundary. In a case where the information regarding the COT indicates extension of the COT, the COT ends after the first sync boundary and by the end of a second sync boundary that occurs following the first sync boundary. By introducing the terminal device 40 of the present embodiment, it is made possible for the terminal device 40 to perform communication by synchronous access.

Although the embodiments of the present disclosure have been described above, the technical scope of the present disclosure is not limited to the above embodiments as they are, and various modifications can be made without departing from the gist of the present disclosure. In addition, components of different embodiments and modifications may be combined as required.

Furthermore, the effects of the embodiments described herein are merely examples and are not limiting, and other effects may be achieved.

Note that the present technology can also have the following configurations.

(1)

A terminal device that performs time synchronization with a communication device at a sync boundary, the terminal device comprising:

a wireless communication unit; and a control unit, wherein the control unit:

transmits, via the wireless communication unit, determination information for determining whether or not to extend a channel occupancy time (COT);

receives information regarding the COT; and performs uplink transmission on a basis of the information regarding the COT that has been received, in a case where the information regarding the COT does not indicate extension of the COT, the COT ends at least by a first sync boundary, and in a case where the information regarding the COT indicates extension of the COT, the COT ends after the first sync boundary and by a second sync boundary that occurs following the first sync boundary.

(2)

The terminal device according to (1), wherein the determination information includes information regarding the COT acquired by the terminal device and information regarding a condition under which the COT can be extended.

(3)

The terminal device according to (1) or (2), wherein the determination information includes at least one of information regarding a carrier sensing result at a sync boundary, information regarding timing at which the COT has been acquired, information regarding timing at which transmission has been started, information regarding a maximum COT length, or a channel access priority class (CAPC).

(4)

The terminal device according to any one of (1) to (3), wherein the determination information includes information regarding a surrounding environment of the terminal device.

(5)

The terminal device according to any one of (1) to (4), wherein the control unit transmits COT sharing information by including the determination information in the COT sharing information.

(6)

The terminal device according to any one of (1) to (4), wherein the control unit transmits configured grant (CG)-uplink control information (UCI) by including the determination information in the CG-UCI.

(7)

The terminal device according to any one of (1) to (6), wherein the information regarding the COT is information indicating a length of the COT.

(8)

The terminal device according to any one of (1) to (6), wherein the information regarding the COT is information indicating whether or not to extend the COT.

(9)

The terminal device according to any one of (1) to (8), wherein the control unit receives information regarding the COT included in group-common downlink control information (DCI).

(10)

A base station device that communicates with a terminal device that performs time synchronization at a sync boundary, the base station device comprising:

a wireless communication unit; and a control unit, wherein the control unit:

receives, via the wireless communication unit, determination information for determining whether or not to extend a channel occupancy time (COT);

transmits information regarding the COT; and receives uplink transmission from the terminal device based on the information regarding the COT that has been received, in a case where the information regarding the COT does not indicate extension of the COT, the COT ends at least by a first sync boundary, and in a case where the information regarding the COT indicates extension of the COT, the COT ends after the first sync boundary and by a second sync boundary that occurs following the first sync boundary.

(11)

A communication method executed by a terminal device that performs time synchronization with a communication device at a sync boundary, the communication method comprising the steps of:

transmitting determination information for determining whether or not to extend a channel occupancy time (COT);

receiving information regarding the COT; and performing uplink transmission on a basis of the information regarding the COT that has been received, wherein, in a case where the information regarding the COT does not indicate extension of the COT, the COT ends at least by a first sync boundary, and in a case where the information regarding the COT indicates extension of the COT, the COT ends after the first sync boundary and by a second sync boundary that occurs following the first sync boundary.

(12)

A communication method executed by a base station device that communicates with a terminal device that performs time synchronization at a sync boundary, the communication method comprising the steps of:

receiving determination information for determining whether or not to extend a channel occupancy time (COT);

transmitting information regarding the COT; and receiving uplink transmission from the terminal device on a basis of the information regarding the COT that has been received, wherein, in a case where the information regarding the COT does not indicate extension of the COT, the COT ends at least by a first sync boundary, and in a case where the information regarding the COT indicates extension of the COT, the COT ends after the first sync boundary and by a second sync boundary that occurs following the first sync boundary.

(13)

A terminal device that performs time synchronization with a communication device at a sync boundary, the terminal device including:

a wireless communication unit; and a control unit;

in which the control unit:

transmits, via the wireless communication unit, determination information for determining whether or not to extend a channel occupancy time (COT);

receives information regarding the COT; and performs uplink transmission on a basis of the information regarding the COT that has been received, in a case where the information regarding the COT does not indicate extension of the COT, a maximum COT, which is a maximum value of the COT, ends at a first sync boundary, and in a case where the information regarding the COT indicates extension of the COT, the maximum COT ends after the first sync boundary and at a second sync boundary that occurs following the first sync boundary.

REFERENCE SIGNS LIST

1 COMMUNICATION SYSTEM
20 BASE STATION DEVICE
40 TERMINAL DEVICE
21, 41 SIGNAL PROCESSING UNIT
24, 45 CONTROL UNIT

The invention claimed is:

1. A terminal device that performs synchronous communications with a base station, the terminal device comprising:

a wireless transceiver; and control circuitry, wherein the control circuitry:

transmits, to the base station via the wireless transceiver, determination information for determining whether or not to extend a channel occupancy time (COT) that has been previously assigned to the terminal device by the base station;

receives information regarding the previously assigned COT from the base station, the information regarding the previously assigned COT being based on the determination information; and performs an uplink transmission to the base station based on the information regarding the previously assigned COT, wherein, in a case where the information regarding the previously assigned COT does not indicate that the previously assigned COT may be extended, the previously assigned COT is not extended so that the uplink transmission ends at least by a first sync boundary corresponding to the previously assigned COT, and in a case where the information regarding the previously assigned COT indicates that the previously assigned COT may be extended, the previously assigned COT is extended so that the uplink transmission ends by a second sync boundary that occurs after the first sync boundary, wherein the determination information includes each of:

information regarding a carrier sensing result at a sync boundary prior to the first sync boundary, information regarding a timing at which the previously assigned COT has been acquired, information regarding a timing at which the uplink transmission is to be started, information regarding a maximum COT length, and a channel access priority class (CAPC).

2. The terminal device according to claim 1, wherein the determination information includes information regarding the previously assigned COT acquired by the terminal device and information regarding a condition under which the previously assigned COT can be extended.

3. The terminal device according to claim 1, wherein the determination information includes information regarding a surrounding environment of the terminal device.

4. The terminal device according to claim 1, wherein the control circuitry transmits COT sharing information by including the determination information in the COT sharing information.

5. The terminal device according to claim 1, wherein the control circuitry transmits configured grant (CG)-uplink control information (UCI) that includes the determination information in the CG-UCI.

6. The terminal device according to claim 1, wherein the information regarding the previously assigned COT is information indicating a length of the previously assigned COT.

7. The terminal device according to claim 1, wherein the information regarding the previously assigned COT is information indicating whether or not to extend the previously assigned COT.

8. The terminal device according to claim 1, wherein the control circuitry receives information regarding the previously assigned COT in group-common downlink control information (DCI).

9. A base station device that communicates with a terminal device that performs synchronous communications with the base station device, the base station device comprising:

a wireless transceiver; and control circuitry, wherein the control circuitry:

receives, from the terminal device via the wireless transceiver, determination information for determining whether or not to extend a channel occupancy time (COT) that has been previously assigned to the terminal device by the base station device;

transmits information regarding the previously assigned COT to the terminal device, the information regarding the previously assigned COT being based on the determination information; and receives an uplink transmission from the terminal device based on the information regarding the previously assigned COT, wherein, in a case where the information regarding the previously assigned COT does not indicate that the previously assigned COT may be extended, the previously assigned COT is not extended so that the uplink transmission ends at least by a first sync boundary corresponding to the previously assigned COT, and in a case where the information regarding the previously assigned COT indicates that the previously assigned COT may be extended, the previously assigned COT is extended so that the uplink transmission ends by a second sync boundary that occurs after the first sync boundary, wherein the determination information includes each of:

information regarding a carrier sensing result at a sync boundary prior to the first sync boundary, information regarding a timing at which the previously assigned COT has been acquired, information regarding a timing at which the uplink transmission is to be started, information regarding a maximum COT length, and a channel access priority class (CAPC).

10. A communication method executed by a terminal device that performs synchronous communications with a base station, the communication method comprising:

transmitting, to the base station, determination information for determining whether or not to extend a channel occupancy time (COT) that has been previously assigned to the terminal device by the base station;

receiving information regarding the previously assigned COT from the base station, the information regarding the previously assigned COT being based on the determination information; and performing an uplink transmission to the base station based on the information regarding the previously assigned COT, wherein, in a case where the information regarding the previously assigned COT does not indicate that the previously assigned COT may be extended, the previously assigned COT is not extended so that the uplink transmission ends at least by a first sync boundary corresponding to the previously assigned COT, and in a case where the information regarding the previously assigned COT indicates that the previously assigned COT may be extended, the previously assigned COT is extended so that the uplink transmission ends by a second sync boundary that occurs after the first sync boundary, wherein the determination information includes each of:

information regarding a carrier sensing result at a sync boundary prior to the first sync boundary, information regarding a timing at which the previously assigned COT has been acquired, information regarding a timing at which the uplink transmission is to be started, information regarding a maximum COT length, and a channel access priority class (CAPC).

11. A communication method executed by a base station device that communicates with a terminal device that performs synchronous communications with the base station device, the communication method comprising:

receiving, from the terminal device, determination information for determining whether or not to extend a channel occupancy time (COT) that has been previously assigned to the terminal device by the base station device;

transmitting information regarding the previously assigned COT to the terminal device, the information regarding the previously assigned COT being based on the determination information; and receiving an uplink transmission from the terminal device based on the information regarding the previously assigned COT, wherein, in a case where the information regarding the previously assigned COT does not indicate that the previously assigned COT may be extended, the previously assigned COT is not extended so that the uplink transmission ends at least by a first sync boundary corresponding to the previously assigned COT, and in a case where the information regarding the previously assigned COT indicates that the previously assigned COT may be extended, the previously assigned COT is extended so that the uplink transmission ends by a second sync boundary that occurs after the first sync boundary, wherein the determination information includes each of:

information regarding a carrier sensing result at a sync boundary prior to the first sync boundary, information regarding a timing at which the previously assigned COT has been acquired, information regarding a timing at which the uplink transmission is to be started, information regarding a maximum COT length, and a channel access priority class (CAPC).

* * * * *